US012630240B2

(12) United States Patent
Siedel

(10) Patent No.: US 12,630,240 B2
(45) Date of Patent: May 19, 2026

(54) CRAWLER TYPE VEHICLE CONFIGURED FOR TRAVELING ALONG A STRUCTURE, METHOD OF HANGING/SUSPENDING THE VEHICLE FOR CARRYING OUT A CRAWLER-LIKE TRAVELING MOTION ALONG THE STRUCTURE, AND USE OF AT LEAST ONE CRAWLER TYPE DRIVE UNIT FOR ACTIVE TRAVELING MOTION

(71) Applicant: Ceilix AG, Pullach i. Isartel (DE)

(72) Inventor: Michael Torsten Siedel, Bad Münstereifel (DE)

(73) Assignee: CEILIX AG, Pullach i. Isartal (DE)

( * ) Notice: Subject to any disclaimer, the term of this patent is extended or adjusted under 35 U.S.C. 154(b) by 59 days.

(21) Appl. No.: 18/853,019

(22) PCT Filed: Mar. 28, 2023

(86) PCT No.: PCT/EP2023/058059
§ 371 (c)(1),
(2) Date: Sep. 30, 2024

(87) PCT Pub. No.: WO2023/186937
PCT Pub. Date: Oct. 5, 2023

(65) Prior Publication Data
US 2025/0242875 A1    Jul. 31, 2025

(30) Foreign Application Priority Data

Mar. 29, 2022    (EP) ...................................... 22165188
Mar. 29, 2022    (EP) ...................................... 22165205
(Continued)

(51) Int. Cl.
*B62D 57/024*    (2006.01)
*B62D 55/075*    (2006.01)
*B62D 55/104*    (2006.01)

(52) U.S. Cl.
CPC ......... *B62D 57/024* (2013.01); *B62D 55/075* (2013.01); *B62D 55/104* (2013.01)

(58) Field of Classification Search
CPC ... B62D 57/024; B62D 55/075; B62D 55/104
See application file for complete search history.

(56) References Cited

U.S. PATENT DOCUMENTS

| | | |
|---|---|---|
| 2018/0050747 A1 | 2/2018 | Kazakov |
| 2024/0308605 A1* | 9/2024 | Cohen ..................... A47L 11/38 |

(Continued)

FOREIGN PATENT DOCUMENTS

| | | |
|---|---|---|
| CN | 110228541 B | 1/2021 |
| DE | 2020100256 U1 | 5/2020 |
| JP | 1984-227570 A2 | 12/1984 |

*Primary Examiner* — Kevin Hurley
(74) *Attorney, Agent, or Firm* — Miller Canfield

(57) ABSTRACT

The present invention provides for a crawler type vehicle (10) configured for traveling in a suspended manner especially headlong at a structure, wherein the vehicle (10) exhibits a plurality of suspension elements configured for suspending the vehicle (10) and configured for coupling the vehicle (10) to the structure, and at least one drive unit (11, 11a, 11b, 11c) configured for circumferential driving motion and accommodating a first circumferential track and a second circumferential track having a different circumferential shape/contour than the first circumferential track. The present invention provides for a method of driving a crawler type vehicle (10) for traveling in a suspended manner especially headlong at a structure.

14 Claims, 25 Drawing Sheets

(30)     Foreign Application Priority Data

| | | |
|---|---|---|
| May 6, 2022 | (EP) | .................................... 22171776 |
| Sep. 1, 2022 | (EP) | .................................... 22193445 |

(56)     References Cited

U.S. PATENT DOCUMENTS

| | | | | |
|---|---|---|---|---|
| 2025/0222995 A1* | 7/2025 | Siedel | .................. | B62D 55/075 |
| 2025/0229853 A1* | 7/2025 | Ilzkovitz | .............. | B62D 55/075 |
| 2025/0242875 A1* | 7/2025 | Siedel | .................. | B62D 57/024 |

* cited by examiner

13

12;12b 20, 20a, 20b

12;12a

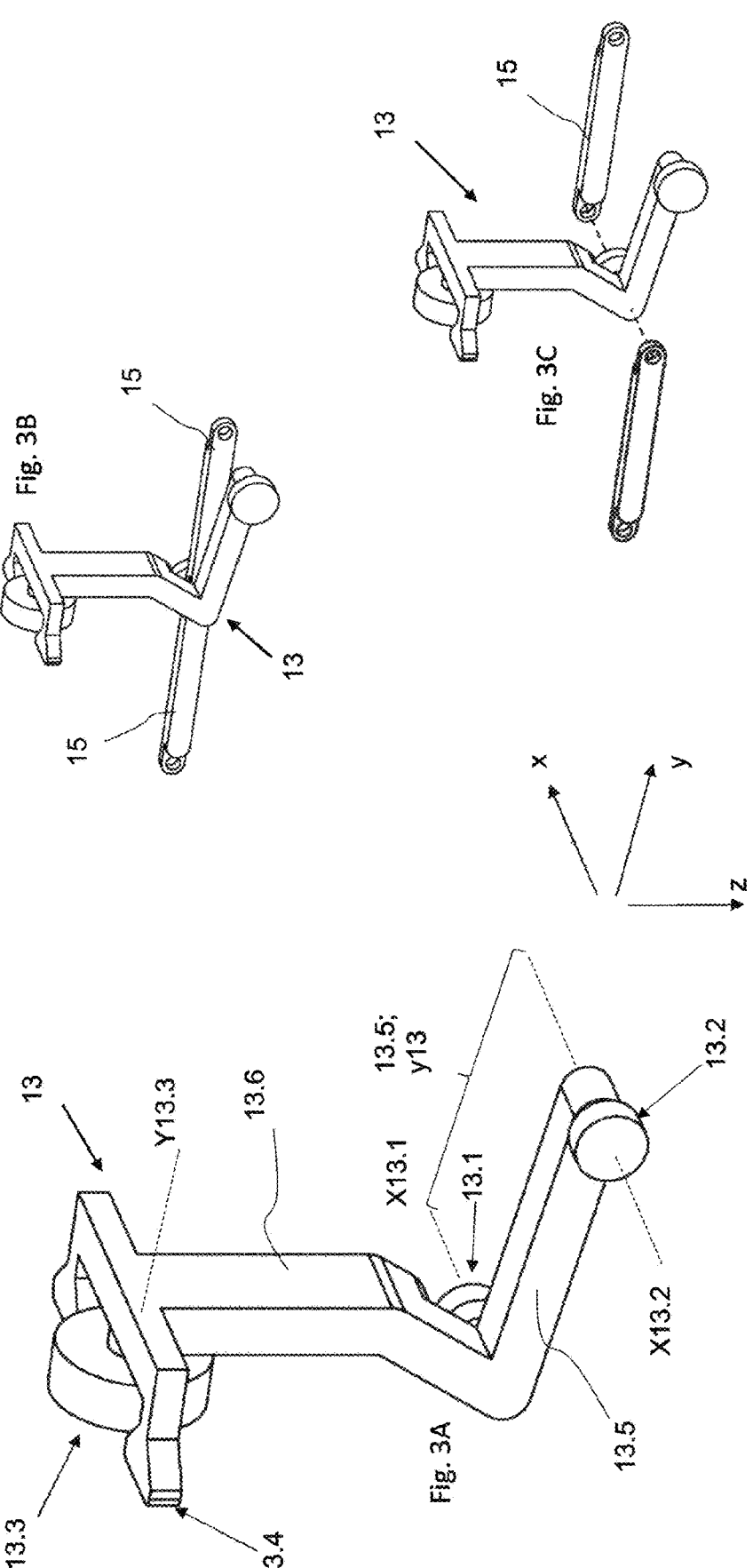

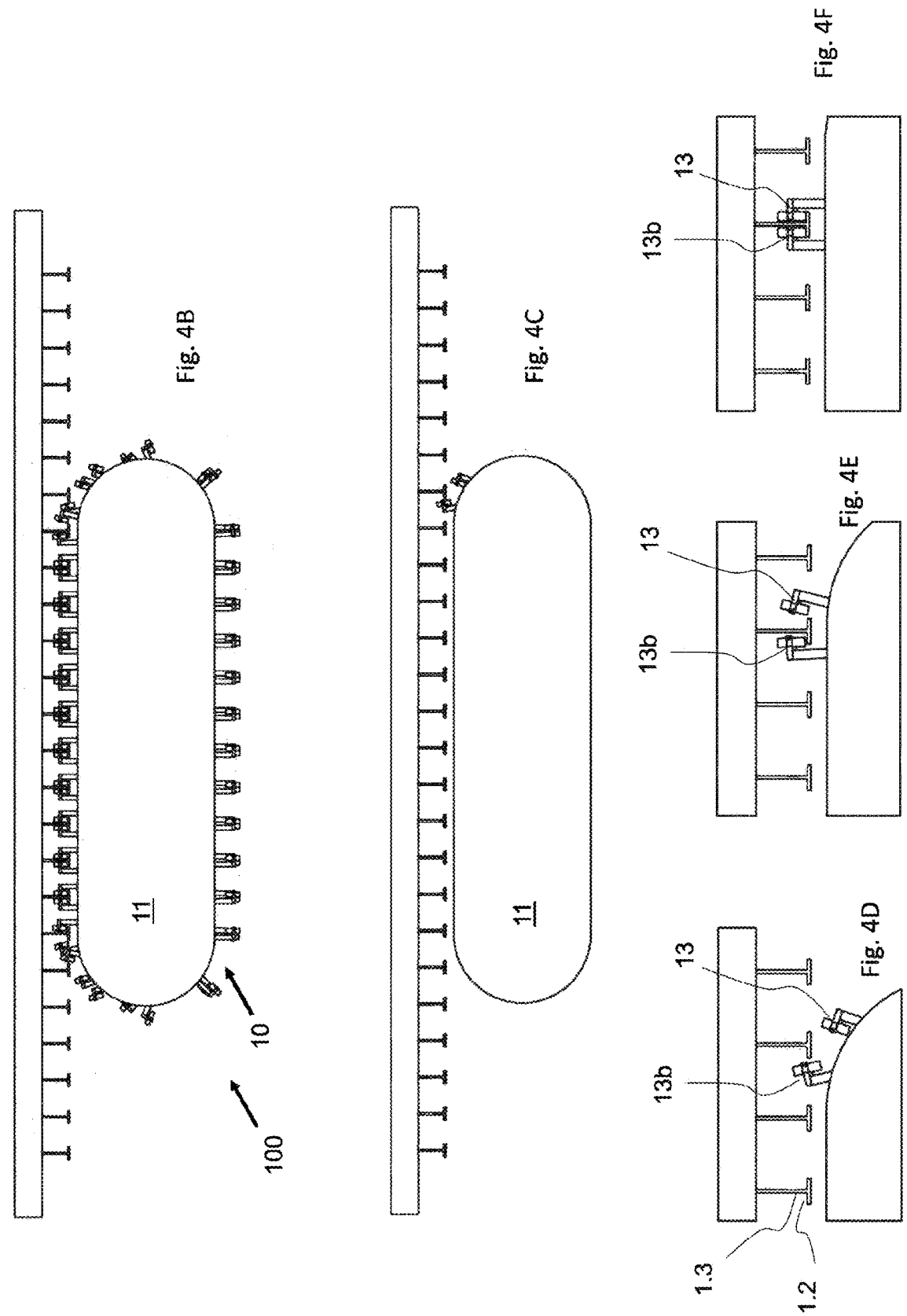

XZa

G13.1

G13.2

XZa

XZb

CRAWLER TYPE VEHICLE CONFIGURED FOR TRAVELING ALONG A STRUCTURE, METHOD OF HANGING/SUSPENDING THE VEHICLE FOR CARRYING OUT A CRAWLER-LIKE TRAVELING MOTION ALONG THE STRUCTURE, AND USE OF AT LEAST ONE CRAWLER TYPE DRIVE UNIT FOR ACTIVE TRAVELING MOTION

CROSS-REFERENCE TO RELATED APPLICATIONS

This invention claims priorities of European patent applications No. EP22165188.8, filed Mar. 29, 2022, No. EP22165205.0, filed Mar. 29, 2022, No. EP22171776.2, filed May 5, 2022 and No. EP22193445.8, filed on Sep. 1, 2022.

TECHNICAL FIELD

The present invention refers to crawler type vehicles, especially ceiling vehicles, configured for traveling in a suspended manner, e.g. headlong at a ceiling structure. Further, the present invention refers to a method for suspending (especially hanging) and optionally also actively driving such a crawler type vehicle. In particular, the present invention refers to devices and methods according to features of the enclosed independent claims.

BACKGROUND

In prior art, multiple design philosophies have already been established in context with provision of vehicles which shall be able to ensure a predefined traveling motion also in rough terrain or in context with unpredictable reaction forces or at high inclination or even in an overhead arrangement. The present invention focuses on those philosophies departing from the idea that the vehicle or transport medium should engage/interact in predefined manner with a predefined structure or underground, be it in an arrangement on the ground/floor (e.g. ground vehicles), be it a structure at a wall or at the ceiling (e.g. overhead cranes, wall crawling robots) e.g. in a storehouse or in machinery hall. Some ideas of provision of reliable contact between the underground structure and the vehicle have already been published in context with diagnosis and parameter measurement in nearly inaccessible areas or systems (e.g. ductwork, canal systems), including magnetic adhesion/interference. Nonetheless, there is a need for vehicles being capable of providing, by interacting with a predefined structure, both a predefined traveling motion and a high accuracy in positioning (positional accuracy) in very reliable manner, preferably irrespective of the kind of underground or wall constitution, wherein the predefined structure should preferably be provided in very flexible and varied manner to many kinds of underground or wall or ceiling contour/geometry.

The skilled person may differentiate between those vehicles which are provided for moving on the underground and those vehicles which are provided for moving along a ceiling structure, especially since the latter have to be suspended in secure manner also, in order to avoid going down. Therefore, there might be different approaches as to the kinematics ensuring interaction/engagement at the structure's interface.

SUMMARY

It is an object of the present invention to provide for a vehicle and driving mechanism which respectively allows for reliable and accurate traveling/driving motion and positioning of the vehicle at/on a structure, preferably not only for one-dimensional tracks, but potentially also for two-dimensional tracks of motion at least along the structure, e.g. also at a ceiling structure. In particular, the object also includes providing for a suspension mechanism resp. suspension means allowing for securely suspending the (ceiling) vehicle on the ground or at a ceiling structure. In particular, the object may also include provision of an appropriate coupling mechanism for reliably coupling the vehicle with the structure. Also, the object of the present invention may further include reliable hanging/suspending methods and optionally also actively driving methods for movably suspending such a vehicle on/at a structure, e.g. in context with logistic tasks in suspended/hanging manner at a ceiling structure.

The object of the present invention is solved by the features of the independent main claims. Advantageous features are indicated in the subclaims. If not explicitly excluded, the teachings of the subclaims can be combined arbitrarily with the teachings of the main claims and the subclaims.

According to a first aspect, the present invention provides for a crawler type vehicle configured for traveling in a suspended manner especially headlong at a structure, wherein the vehicle exhibits:

a plurality of suspension elements configured for suspending the vehicle and configured for coupling the vehicle to the structure, at least one drive unit configured for circumferential motion and accommodating a first circumferential track and a second circumferential track having a different circumferential shape/contour than the first circumferential track, wherein the suspension elements are attached to the first circumferential track at predefined first longitudinal positions corresponding to a predefined raster, wherein the vehicle is configured for moving along the structure by decoupling a subset of the plurality of suspension elements from resp. coupling them into the structure when the suspension elements are guided along the two circumferential tracks by the circumferential motion. Such configuration also allows for a coupling mechanism which can be implemented optionally in context with actively driven vehicles or in context with passive units which can fulfil the function of a vehicle when activated/driven externally resp. by any further means which are not necessarily part of the vehicle.

Thereby, the present invention also provides for a connection system resp. connecting mechanism especially allowing for connection to a flat surface and enabling movement in two directions, especially in context with belt driven devices configured for traversing level surfaces in a latitudinal and longitudinal direction, including surfaces placing devices in a suspended situation.

Accordingly, the present invention also concerns kinematics of suspension elements being de-/coupled by a driving motion along circumferential tracks. In particular, the object is therefore solved by a crawler type vehicle (especially ceiling vehicle) configured for traveling in a suspended manner especially headlong at a structure (especially ceiling structure), wherein the vehicle exhibits: a plurality of suspension elements configured for suspending the vehicle and configured for coupling the vehicle to the structure, and at least one drive unit (especially a crawler track-like drive unit) configured for circumferential driving/guiding motion (resp. drive motion along the circumferential tracks) and configured for accommodating a first circumferential track and a second circumferential track having a different circumferential shape/contour than the first circumferential track, wherein the suspension elements are attached to the first circumferential track at predefined first longitudinal positions corresponding to a predefined raster (especially a/the raster defined by the structure), wherein the vehicle is configured for moving along the structure by decoupling a subset of the plurality of suspension elements from resp. coupling them into the structure when the suspension elements are guided along (the) two circumferential tracks by the circumferential motion (driving/guiding motion). Such a configuration also allows for moving the vehicle without being limited to a predefined path of motion defined by e.g. a rail (or the like) of the structure.

According to the present disclosure, when it is referred to "structure" or "ceiling structure", likewise, a structure which may also extend on the ground or along a wall or on an inclined plane (or the like) can be designated. The present invention can preferably be applied for ceiling vehicles being arranged at resp. traveling along a ceiling structure, and in addition, the present invention also allows for any motion along any structure with alternative orientation and/or arrangement. Thus, referring to a "structure" or "ceiling structure" includes reference to any other "structure" exhibiting the features allowing for coupling with/to the inventive vehicle and de-/coupling kinematics.

According to the present disclosure, when it is referred to "vehicle" or "ceiling vehicle", the disclosure also generally refers to crawler type vehicles and its relative spatial arrangement or traveling motion (e.g. also on the ground or on an inclined plane or at the wall).

According to the present disclosure, when it is referred to "circumferential track", the disclosure also generally refers to closed loop guidings and lines and predefined contours along which the suspension elements are guided and/or driven.

According to the present disclosure, when it is referred to "profiles" or "T-profiles", the disclosure also generally refers to different kinds of profiles like e.g. l-profiles or L-profiles which may provide for advantageous/favourable arrangements in individual applications.

According to one embodiment, the suspension elements are coupled with the ceiling structure based on form fit (form closure, positive locking), especially exclusively form fit (no force-fit coupling). According to the invention, it has been found that form fit can advantageously be provided by wheels or any other bearing points at a free end of the respective suspension element for being in contact with T-profiles or other kinds of profile rails of the ceiling structure (e.g. C-profiles or L-profiles or l-profiles). It has been found that form fit provides for a preferred/superior manner of coupling in many circumstances, especially in comparison with magnet coupling or the like. Depending on the kind of drive unit or vehicle or spatial orientation of the structure, the skilled person can decide which kind of profile (e.g. T-profile) is most appropriate.

Also, depending on the orientation of the structure, the drive unit's traveling motion (as to its spatial direction resp. locomotion) can be individual. The skilled person may implement the present invention for different kinds of spatial traveling motions, especially without any limitation, i.e., in 2D or even 3D degrees of freedom.

Also, the shape/contour of respective circumferential tracks can be individual, i.e., the skilled person can decide e.g. about a certain degree (radius) of curvature in specific sections of the respective circumferential track. For example, each track exhibits at least three different guide/rail sections, namely: a first (linear) section in which each suspension element is engaged with the profile, wherein the suspension element performs a linear motion; and at least one second (curved) section in which each suspension element performs a decoupling motion (wherein each track may exhibit two second sections being arranged oppositely); and a third (linear) section in which the suspension elements are returned to couple again with the profile (for continuous, circumferential motion and engagement process). Thereby, first and second tracks may define the trajectory of the respective free ends of the suspension elements (especially exhibiting at least one roller being attached to the respective suspension element) by any appropriate means (e.g. by a gliding/rolling contour, a chain drive, a timing belt, or any likewise mechanism or mechanical feature) which is configured for predefining a specific contour and for guiding the free ends resp. the rollers to follow that contour of the tracks.

According to a second aspect, the present invention concerns an application at a ceiling, especially also in context with hoist functionality, wherein suspension can specifically be provided in view of 2D traveling motion also along the ceiling structure.

In particular, the above mentioned object can also be solved by a crawler type ceiling vehicle, especially with ceiling hoist, configured for traveling in a suspended manner especially headlong at a ceiling structure, wherein the ceiling vehicle exhibits:

a plurality of suspension elements configured for suspending the ceiling vehicle and configured for coupling the ceiling vehicle to the ceiling structure, at least one drive unit configured for circumferential motion and accommodating a first circumferential track and a second circumferential track having a different circumferential shape/contour than the first circumferential track, wherein the suspension elements are attached to the first circumferential track at predefined first longitudinal positions corresponding to a predefined raster, wherein the ceiling vehicle is configured for moving along the ceiling structure by decoupling a subset of the plurality of suspension elements from resp. coupling them into the ceiling structure when the suspension elements are guided along the two circumferential tracks by the circumferential motion.

In particular, the above mentioned object can also be solved by a crawler type vehicle configured for traveling along a structure having a predefined raster, wherein the vehicle exhibits: a plurality of suspension elements configured for coupling the vehicle to the structure, and at least one drive unit (especially crawler track-like) configured for (crawler-type) circumferential driving/guiding motion and accommodating a first circumferential track and a second circumferential track having a different circumferential shape/contour than the first circumferential track at least in curved sections of the track(s), wherein the suspension elements are attached to the first circumferential track at predefined first longitudinal positions corresponding to the raster of the structure, wherein the suspension elements are aligned/oriented by the second circumferential track at predefined second longitudinal positions corresponding to the raster of the structure and respectively differing from the corresponding first longitudinal positions, wherein the vehicle is configured for moving along the structure in at least one spatial direction by decoupling a subset of the plurality of suspension elements from resp. coupling them into the structure when the suspension elements are guided along a curved section of the circumferential tracks by the circumferential motion.

In particular, the above mentioned object can also be solved by a crawler type ceiling vehicle configured for traveling in at least two spatial directions in a suspended manner headlong at a ceiling structure defining a first of said spatial directions, the traveling motion having at least two degrees of freedom, wherein the ceiling vehicle exhibits: a plurality of suspension elements configured for suspending the ceiling vehicle and configured for coupling the ceiling vehicle to the ceiling structure such that the suspension elements can be moved (e.g. rolled, glided) along the ceiling structure in said first spatial direction, and at least one drive unit (especially crawler track-like) accommodating a first circumferential track and a second circumferential track and configured for circumferential driving/guiding motion, wherein the suspension elements are attached to the first circumferential track at predefined first longitudinal positions corresponding to a raster defined by the ceiling structure in a second of said spatial directions, wherein the suspension elements engage the second circumferential track at predefined second longitudinal positions, wherein the first and second tracks have a different shape/contour, wherein the first and second tracks are (fixedly) arranged with respect to each other in such a manner that the suspension elements are decoupled from resp. coupled into the ceiling structure by a/the (crawler track-like) circumferential motion provided by the first and second drive units or tracks.

In particular, the above mentioned object can also be solved by a crawler type vehicle configured for traveling/driving along a structure having a predefined raster, wherein the vehicle exhibits: a plurality of suspension elements configured for coupling the vehicle to the structure, and de-/coupling kinematics comprising a first circumferential track and a second circumferential track having a different circumferential shape/contour than the first circumferential track at least in curved sections of the track(s), wherein the suspension elements are attached to the first circumferential track at predefined first longitudinal positions corresponding to the raster of the structure, wherein the suspension elements are guided in/by the second circumferential track at respective second longitudinal positions being longitudinally offset with respect to the respective first longitudinal position, and at least one drive unit (especially crawler track-like) configured for (crawler-type) circumferential driving/guiding motion and accommodating the first and second circumferential tracks, wherein the de-/coupling kinematics provide for both a first (vertical) motion orthogonal to the driving/guiding direction and a second motion pivoting each suspension element when it is guided along a/the (momentary) curved section of the circumferential tracks by the circumferential motion.

According to a third aspect, the present invention concerns a logistic system and logistic applications and hoist functionality especially in context with 2D or 3D traveling motion either of drive units or of a load carried by at least one drive unit or hoist.

In particular, the above mentioned object can also be solved by hoist arrangement configured for three-dimensional (3D-) movement at/along a structure having a predefined raster, wherein the hoist arrangement exhibits at least one hoist unit and a crawler type vehicle configured for traveling along the structure, especially in a suspended manner especially headlong at the structure, wherein the crawler type vehicle exhibits:

a plurality of suspension elements configured for suspending the crawler type vehicle and configured for coupling the crawler type vehicle to the structure, at least one drive unit configured for circumferential motion and accommodating a first circumferential track and a second circumferential track having a different circumferential shape/contour than the first circumferential track, wherein the suspension elements are attached to the first circumferential track at predefined first longitudinal positions corresponding to the structure's predefined raster, wherein the crawler type vehicle is configured for moving along the structure by decoupling a subset of the plurality of suspension elements from resp. coupling them into the structure when the suspension elements are guided along the two circumferential tracks by the circumferential motion.

Generally speaking, the vehicle is configured for moving along the ceiling structure in at least one spatial direction by decoupling a subset of the plurality of suspension elements from resp. coupling them into the structure, especially when said subset of suspension elements are guided along a curved section of the circumferential tracks. It should be noted that according to the invention, the term "spatial direction" designates a direction in space, thus, the term "spatial direction" may comprise a motion along a space axis in both directions along the space axis. Thus, the term "in at least one spatial direction" designates a one-dimensional motion (which is optionally bidirectional, i.e., back and forth) having one degree of freedom (especially linear motion). Consequently, a/the term "two-dimensional motion" refers to a motion having two degrees of freedom (especially linear motion in a first spatial direction and in a second spatial direction, the second spatial direction e.g. being orthogonal to the first spatial direction, optionally also in bidirectional manner).

It should be noted that according to the invention, the term "drive unit" especially may designate the whole assembly of drive components and kinematic components required for realizing the desired traveling motion. But, the drive unit does not necessarily include any active motor or drive. Also, the drive unit may further comprise a case or chassis accommodating structural parts and elements for arrangement of any parts of the drive section. Further, the drive unit may also comprise structural parts or supports or beams for mounting and support of any hoist component or passenger/cargo transport components.

The shape or dimension of the at least one drive unit (and also of the circumferential tracks) can be defined individually according to specific applications. E.g., the cross-section geometry of the at least one drive unit is in the shape of a racecourse (parallel longitudinal sections and opposite semicircle sections). But, alternatively, the cross-section geometry can also be circular or elliptical for example.

The vehicle may (optionally) comprise different kinds of power units, drives, motors and actuators, not only for the drive units, but also for further functions as e.g. winch or hoist functions. Generally, the vehicle can be provided as a passive vehicle without any motor for driving the vehicle (then, the vehicle can be positioned e.g. via external forces which apply on a hoist mechanism or the like) or as an active vehicle exhibiting at least one motor interacting with the driving mechanism resp. with the suspension elements. In particular, the vehicle exhibits at least one power unit or motor for each resp. for the at least one drive unit, e.g. an electric motor which is coupled to an axis of rotation of a gear unit interacting with the respective circumferential track. Also, the vehicle may optionally exhibit at least one motor interacting with a/the wheels of the suspension elements, in order to allow for motorized motion in a further spatial direction; thus, the wheels can be driven by any drive to actively drive along the profile rails. Also, the vehicle resp. the at least one drive unit may comprise an energy storage unit, especially a rechargeable battery pack, providing energy to the at least one drive/motor, irrespective of any external energy supply (power to motors for driving the vehicle resp. the tracks resp. the guiding motion along the tracks). In particular, the vehicle may also exhibit at least one hoist (hoist unit) and a traction mechanism configured for lifting loads. E.g., the hoist unit can be fixed to and supported by the at least one drive unit.

Each power unit, drive, motor and/or actuator of the vehicle can be coupled to a control unit of the vehicle. In particular, the control unit may control the type/kind of motion, and the control unit may also control e.g. a lifting action of a hoist unit e.g. in context with cargo tasks or logistic tasks in general. For example, the vehicle may exhibit two or three drive units which can be arranged in predefined lateral distance to each other (e.g. defined/connected via cross-beams or the like), and in case the vehicle should be driven in active manner (which configuration is optional), each drive unit may exhibit at least one drive/motor for (actively) driving the suspension elements along the circumferential tracks, and these drives/motors can be controlled depending on each other, e.g. via the speed of rotation. Thus, a traveling direction can be controlled also, especially in combination with actively driven wheels of the suspension elements being driven along the profile rails of the ceiling structure (which active drive aspect is optional, too).

In other words, in the present disclosure, the term "drive unit" especially refers to a unit accommodating kinematics allowing for traveling motion of the vehicle. Thus, the term "drive unit" not necessarily implies presence of active motors; rather, the traveling motion may also be induced by external forces; thus, the term "drive unit" not necessarily implies the unit to be driven in active manner. Thus, the term "driving motion" (which designates circumferential motion along the first and second circumferential tracks) is different from the term "traveling motion" which designates a motion of the vehicle itself.

It has been found that the kinematics according to the present invention allow for equipping the vehicle with at least one drive unit; i.e., there is no need of providing more than one drive unit; preferably, two or even three drive units (especially in view of improved form-fit) allow for even more reliable suspension.

In the following, advantageous aspects of the claimed invention are explained and further below, preferred modified embodiments of the invention are described. Explanations, in particular on advantages and definitions of features, are basically descriptive and preferred, but not limiting examples. If an explanation should be understood as limiting explanation/expression, this is expressly mentioned.

According to one embodiment the ceiling vehicle exhibits a first drive unit accommodating the first and second circumferential tracks, and the ceiling vehicle exhibits a second drive unit also accommodating a further first and second circumferential tracks. The drive units of the vehicle can be scaled up in number; e.g., the vehicle exhibits tree drive units each being based on the same kinematic concept, but at least one of these drive units providing for mirror-inverted type/manner of de-/coupling kinematics.

According to one embodiment the at least one drive unit of the crawler type vehicle is configured for enabling a closed loop trajectory of the suspension elements, especially by the respective drive unit(s) along the circumferential track(s). This configuration is also favourable in view of scaling.

According to one embodiment the first and second circumferential tracks (of the respective drive unit) are shaped in such a manner that the suspension elements are de-/coupled from/into the ceiling structure only when passing a curved section of the tracks. This also allows for providing, along a rectilinear section of the tracks, a section in which suspension of the vehicle can be secured by a scalable number of suspension elements.

According to one embodiment the suspension elements are fixedly attached/coupled by means of a first pulley to/with the first circumferential track, wherein the suspension elements are guided within the second circumferential track by means of a second pulley respectively, wherein the first and second pulley preferably are arranged at a lever arm of the respective suspension element, wherein the respective suspension element preferably has an L-shape resp. the shape of an L-profile. This also favours relative arrangement of two pulley (with respect to each other in a predefined distance) which are guided by/in the circumferential tracks.

According to one embodiment each suspension element exhibits a first pulley and a second pulley arranged in longitudinal distance with respect to the first pulley at a lever arm of the suspension element, wherein the (respective) suspension element is coupled to the first and second tracks via the first and second pulleys. This arrangement also allows for high accuracy of the predefined path and amount of the predefined motion of a free end (or of a/the wheel) of the respective suspension element.

According to one embodiment each suspension element exhibits a lever arm accommodating/supporting a/the pulley guided by the second track, wherein the pulley is arranged at a free end of the lever arm, and wherein in a linear section of the track, the lever arm is pointing in the driving/traveling direction (second spatial direction), at least roughly. This also allows for effecting a great effective length of the lever arm section between the first and second pulley, thereby ensuring considerable pivot motions for de-/coupling kinematics.

According to one embodiment the first circumferential track exhibits a chain (resp. belt or similar kind of traction means) or is provided/defined by a chain forming a closed loop of interrelated chain elements. This configuration also allows for adjusting the shape/contour of the track by means of a chain tensioning device or other kinds of deviating point/pulley. In particular, the first circumferential track can be defined by a chain connecting the suspension elements.

According to the present disclosure, the term "chain" may also refer to a belt or cable or any other circumferential driving element that allows to follow/constrain to the circumferential track(s). The skilled person may decide which configuration of the chain is most appropriate in/for an individual application.

According to one embodiment the ceiling vehicle exhibits a plurality of counter bearings, especially configured and arranged for frontally interacting with the (ceiling) structure, wherein the plurality of counter bearings are preferably coupled to/with the first circumferential track, especially coupled to chain elements of the first circumferential track. This configuration also allows for securing the vehicle's positions with respect to a further spatial direction, especially orthogonally to the structure resp. orthogonally to the rails (normal force being exerted on the structure in case the vehicle is arranged in a headlong manner upside down or at an inclined plane). In particular, the plurality of counter bearings may/can provide for a counter force drive module (counter force unit) which allows/facilitates even more secure positioning and suspension of the vehicle, e.g. on an inclined plane or in an overhead arrangement (upside down). The free ends of the counter bearings can be configured in dependence on the type/shape of the (ceiling) structure; e.g., the free ends of the counter bearings exhibit at least one wheel or pulley.

According to one embodiment the ceiling vehicle exhibits a further drive unit (especially crawler track-like) accommodating further first and second circumferential tracks and being configured for synchronous circumferential motion of further suspension elements. This facilitates scaling up and favours configurations for vehicles having high stability and security requirements.

According to one embodiment the ceiling vehicle exhibits a further drive unit accommodating further (first and second) circumferential tracks, wherein a plurality of further suspension elements are attached to the further circumferential tracks in predefined longitudinal positions corresponding to a/the predefined raster and are configured for suspending the ceiling vehicle and for coupling the ceiling vehicle to the ceiling structure, especially such that the ceiling vehicle is secured with respect to opposite directions at the ceiling structure. This also provides for high security and even self-locking suspension.

According to one embodiment the suspension elements (of a/the first drive unit) and the further suspension elements (of a/the further drive unit) are securing/blocking the ceiling vehicle at the ceiling structure both with respect to the driving/traveling direction (second spatial direction) and opposite thereto, especially such that slipping off the ceiling structure is prevented. This also allows for high security levels. Optionally, the vehicle may also comprise at least three drive units.

According to one embodiment the suspension elements are connected to each other by means of longitudinal connecting elements, especially by longitudinal connecting elements being connected at the axis of a/the first pulley of the respective suspension element, thereby forming a closed loop of interrelated suspension elements distanced to each other in the predefined raster. This also ensures accurate relative arrangement of the plurality of suspension elements with respect to each other. Each longitudinal connecting element preferably exhibits the shape of a rod or stick or small lever arm. In other words: The plurality of longitudinal connecting elements may provide for a closed loop of interrelated elements which form a kind of chain or the like which is guided/driven along the circumferential track(s).

According to one embodiment the ceiling vehicle exhibits a further (second) drive unit which exhibits the same configuration as a/the first drive unit but with mirror-inverted arrangement of the further suspension elements and further circumferential tracks, wherein the further suspension elements are guided/driven in a direction opposite to the guiding direction of the suspension elements of the first drive unit, especially such that both the respective suspension elements and the further suspension elements are simultaneously de-/coupling to/from the ceiling structure. This configuration advantageously fits with a ceiling structure being made of or being provided by T-profiles or T-shaped support elements (especially T-shaped ceiling beams).

According to one embodiment the at least one drive unit is configured for lifting the respective suspension element out of the ceiling structure in an unloaded state, especially such that the at least one crawler type drive unit provides for both de-/coupling kinematics for a subset of momentarily unloaded suspension elements and suspension of the vehicle by a subset of momentarily loaded suspension elements at the same time. This kind of decoupling kinematics also provides for a quite energy-efficient and force-efficient manner of driving/traveling/advancing. Also, minimising forces and momentum in context with decoupling process also favours potentially very fast crawling motion(s) even in case the vehicle exhibits considerable weight or has to lift considerable loads.

According to one embodiment the at least one drive unit has a substantially plane configuration, in a lateral view (side-face). According to one embodiment the drive units (especially two or three drive units) are arranged in parallel to each other. This also favours implementation of tow or even three drive units in a quite narrow/slim arrangement, respectively.

According to one embodiment the circumferential tracks are respectively guided/driven in a plane, extending in two-dimensional manner. This may also favour implementation of a linear traveling motion which can be combined with a further motion along the ceiling structure, especially orthogonally to the direction of the traveling motion.

According to one embodiment the vehicle is configured for traveling in at least two spatial directions, namely a first spatial direction being predefined by the ceiling structure and a second spatial direction being defined by the driving/guiding motion along the circumferential tracks, wherein the second spatial direction is (at least approximately) orthogonal to the first spatial direction. This also further increases flexibility and variability of the kind of motion and positioning of the vehicle.

According to one embodiment the respective suspension element exhibits at least one wheel which is arranged and configured for being guided along the ceiling structure, especially on a wheel tread of a respective/corresponding T-profile of the ceiling structure. This kind of coupling/suspension at/on the ceiling structure also facilitates two-dimensional traveling motion.

It should be noted that the present invention allows for advantageous realization of an omniwheel behaviour of the vehicle, providing for at least two-dimensional locomotion capacities of the vehicle.

According to one embodiment the respective drive unit is coupled by means of at least three suspension elements. This also provides for distributing any forces and momentum via a plurality of suspension elements, thereby ensuring a good security and stability level also.

According to one embodiment the respective suspension element has an L-shape (resp. the shape of an L-profile) which provides for two arms defining the relative arrangement of a/the wheel and first and second pulleys (engaging the first and second circumferential tracks) of the respective suspension element. This also allows for a robust design; also, the suspension elements can easily be designed individually depending on specific applications and specific ceiling structures, by adapting the design of the lever arms.

The above mentioned object is also solved by a crawler type vehicle arrangement (especially ceiling vehicle arrangement) comprising at least one vehicle (especially ceiling vehicle) as described above and a/the structure (especially ceiling structure) exhibiting a plurality of profiles (especially T-profiles) defining a/the raster of the structure, wherein the raster of the relative arrangement of the suspension elements corresponds to the structure's raster, wherein a subset of the suspension elements (namely those momentarily engaging the profiles) are arranged/configured for being guided (especially rolled) along the profiles in a (first) spatial direction being defined by the structure, the vehicle's traveling motion thereby having at least two degrees of freedom. This provides for above mentioned advantages, especially in view of an optimized form-fit at the coupling interface between suspension elements and the structure.

According to one embodiment the ceiling structure exhibits a plurality of profiles (especially T-profiles) defining a/the raster of the ceiling structure, wherein the ceiling vehicle exhibits a plurality of further suspension elements (of a second type) suspending the ceiling vehicle together with the suspension elements (of a/the first type), wherein the suspension elements and the further suspension elements secure/block the ceiling vehicle at the ceiling structure with respect to the driving/traveling direction (second spatial direction). This may further increase security and stability level. In such an arrangement, the at least one drive unit preferably exhibits a/one first circumferential track (which can be provided/defined by, e.g., a chain) and two second circumferential tracks, wherein one of the second circumferential tracks is arranged such that its shape/contour is arranged in asymmetrical manner with respect to the shape/contour of the other/corresponding second circumferential track. Such an arrangement is also favourable for advantageously arranging and aligning both the suspension elements and the further suspension elements by means of one drive unit.

According to one embodiment the T-profiles (or any other suitable kind of profile rails) respectively exhibit at least one power rail, wherein the ceiling vehicle is configured for (actively) driving the at least one drive unit by means of energy supplied via the power rails, especially via current collectors provided within the suspension elements. This may also facilitate energy supply irrespective of any relative position or time/duration of operation. Alternatively, the at least one drive unit may provide for energy (e.g. electric energy) on its own, e.g. by means of an on board battery.

The above mentioned object is also solved by a method of hanging/suspending a crawler type ceiling vehicle at/from a ceiling structure for traveling in a suspended manner headlong the ceiling structure (especially also actively driving the crawler type ceiling vehicle), especially a crawler type ceiling vehicle as described above, wherein the ceiling vehicle is suspended by means of a plurality of suspension elements coupling the ceiling vehicle to the ceiling structure, wherein a circumferential guiding/driving motion is defined by first and second circumferential tracks (12*a*, 12*b*) having a different circumferential shape/contour (e.g., the circumferential guiding/driving motion is provided by at least one drive unit accommodating the first and second circumferential tracks), wherein the suspension elements are attached to the first circumferential track at predefined first longitudinal positions corresponding to a raster defined by the ceiling structure, wherein the ceiling vehicle is suspended such that it can move along the ceiling structure by decoupling a subset of the plurality of suspension elements from resp. coupling them into the ceiling structure when the suspension elements are guided along the circumferential tracks by the circumferential motion (guiding/driving motion). This provides for above mentioned advantages, especially in view of a high degree of autonomy (movability) and security of any motion along the ceiling structure.

The above mentioned object can also be solved by a method of providing a two-dimensional crawler-like traveling motion or two-dimensional positioning by means of a crawler type ceiling vehicle being suspended headlong at a ceiling structure defining a first spatial direction, especially by means of a crawler type ceiling vehicle as described above, wherein a plurality of suspension elements suspending the ceiling vehicle are momentarily coupled with the ceiling structure such that the suspension elements can be moved (e.g. rolled, glided) along the ceiling structure in said first spatial direction, wherein a circumferential guiding/driving motion is provided by at least one drive unit (especially crawler track-like) accommodating a first circumferential track and a second circumferential track, wherein the suspension elements are attached to the first circumferential track at predefined first longitudinal positions corresponding to a raster defined by the ceiling structure in a second of said spatial directions, wherein the suspension elements engage the second circumferential track at predefined second longitudinal positions, wherein the first and second tracks have a different shape/contour, wherein the suspension elements are decoupled from resp. coupled into the ceiling structure by a/the circumferential guiding/driving motion of the at least one drive unit or tracks, wherein during the circumferential guiding/driving motion, the first and second tracks remain in (fixed) relative arrangement with respect to each other, especially in parallel arrangement.

The above mentioned object can also be solved by a method of providing a crawler-like traveling motion or positioning by means of a crawler type vehicle being coupled to a structure having a predefined raster, especially by means of a crawler type vehicle as described above, wherein a plurality of suspension elements of the vehicle are momentarily coupled to the structure, wherein a circumferential guiding/driving motion is provided by at least one drive unit (especially crawler track-like) accommodating a first circumferential track and a second circumferential track having a different circumferential shape/contour than the first circumferential track at least in curved sections of the track(s), wherein the suspension elements are attached to the first circumferential track at predefined first longitudinal positions corresponding to the raster of the structure, wherein the suspension elements are aligned/oriented by the second circumferential track at predefined second longitudinal positions corresponding to the raster of the structure and respectively differing from the corresponding first longitudinal positions, wherein the traveling motion or positioning of the vehicle is provided moving the vehicle along the structure in at least one spatial direction based on the circumferential guiding/driving motion which includes/evokes decoupling a subset of the plurality of suspension elements from resp. coupling them into the structure when the suspension elements are guided along a curved section of the circumferential tracks by the circumferential motion.

The above mentioned object can also be solved by a method of providing a crawler-like traveling motion or positioning by means of a crawler type vehicle being coupled to a structure having a predefined raster, especially by means of a crawler type vehicle as described above, wherein a plurality of suspension elements of the vehicle are momentarily coupled to the structure, wherein de-/coupling kinematics comprising a first circumferential track and a second circumferential track having a different circumferential shape/contour than the first circumferential track at least in curved sections of the track(s) provide for respectively de-/coupling a subset of the suspension elements to/from the structure when guiding/driving the suspension elements along a curved section of the circumferential tracks, especially by means of at least one drive unit (especially crawler track-like) accommodating the first and second circumferential tracks, wherein the suspension elements are attached to the first circumferential track at predefined first longitudinal positions corresponding to the raster of the structure, wherein the suspension elements are guided in/by the second circumferential track at respective second longitudinal positions being longitudinally offset with respect to the respective first longitudinal position, wherein the de-/coupling kinematics provide for both a first (vertical) motion orthogonal to the traveling/driving direction and a second motion pivoting each suspension element when it is guided along a/the (momentary) curved section of the circumferential tracks by the circumferential guiding/driving motion.

According to one embodiment the circumferential motion is transmitted/transferred by the suspension elements momentarily engaging the ceiling structure. This also allows for distributing any forces and momentum via all suspension elements momentarily engaging the ceiling structure. In other words: Scaling can easily be done via the length of the vehicle. It should be noted that actio can be provided by the (respective) drive unit(s), and only reactio is provided by the ceiling structure. There is no need of any active component or drive acting within the ceiling structure.

According to one embodiment the guiding/driving motion is provided by first and second drive units, wherein the first drive unit provides for a circumferential motion of a first subset of the suspension elements on a first closed loop trajectory (especially in a first direction) and the second drive unit provides for a circumferential motion of a second subset of the suspension elements on a second closed loop trajectory (especially in a second direction which moving direction is optionally the same or different from the first closed loop trajectory, especially opposite to the first closed loop trajectory). This arrangement also favours a secure manner of coupling, wherein the vehicle can be secured in different spatial directions.

According to one embodiment the circumferential guiding/driving motion is a passive guiding motion in reaction to external actuation on the vehicle, e.g. provided by an external pushing or driving force which can be transmitted to the vehicle via at least one lateral surface of the vehicle or the at least one drive unit. In other words: The vehicle is not necessarily driven by itself, rather, it can also be driven indirectly by external means, e.g. also by a person exerting a pushing/pulling force thereon.

The above mentioned object is also solved by a computer program comprising instructions which, when the program is executed by a computer, cause the computer to execute the steps of the method described above. This provides for above mentioned advantages, especially in view of remote control of the vehicle.

The above mentioned object is also solved by use of at least one crawler type drive unit accommodating first and second circumferential tracks having different circumferential shapes/contours, for hanging/suspending and optionally also actively driving a crawler type ceiling vehicle to travel in a suspended manner especially headlong at a ceiling structure, especially for hanging/suspending and optionally also actively driving a crawler type ceiling vehicle as described above, especially in a method as described above, wherein the ceiling vehicle is suspended by means of a plurality of suspension elements coupling the ceiling vehicle to the ceiling structure, wherein the suspension elements are attached to the first circumferential track at predefined first longitudinal positions corresponding to a raster defined by the ceiling structure, wherein a/the circumferential guiding/driving motion is provided by the at least one drive unit such that the vehicle moves along the ceiling structure by decoupling a subset of the plurality of suspension elements from resp. coupling them into the ceiling structure when the suspension elements are guided/driven along the circumferential tracks. This provides for above mentioned advantages, especially also in view of allowing for a simple and cost-effective ceiling structure. In other words: The at least one crawler type drive unit provides for both de-/coupling kinematics and suspension of the vehicle at the same time (simultaneously). In that context, using battery technology (e.g. embedded in the vehicle to supply energy to the vehicle, e.g. for powering an on board controller, hoist(s) and motor(s) for locomotion), may render the vehicle even more autonomous.

The above mentioned object is also solved by use of at least one drive unit (especially crawler track-like) accommodating a first and a second circumferential track for providing an at least one-dimensional crawler-like traveling motion along a structure having a predefined raster, especially along/at a ceiling structure, wherein the first and second tracks are fixedly arranged with respect to each other in a crawler type vehicle being suspended by means of a plurality of suspension elements, especially headlong at the (ceiling) structure, wherein the suspension elements are guided by the circumferential tracks when providing a circumferential guiding/driving motion (especially a synchronous motion for both tracks of the drive unit) to the tracks by the at least one drive unit, wherein the circumferential tracks have a different shape/contour which differ with respect to each other at least in curved sections of the tracks in such a manner that a subset of the suspension elements are decoupled from resp. coupled into the structure when providing the circumferential guiding/driving motion, especially with the subset only including (those) suspension elements being momentarily arranged in a/the respective curved section of the tracks, especially use of the at least one drive unit in a vehicle as described above, especially for/in a method as described above.

The above mentioned object is also solved by use of at least one drive unit accommodating a first and a second circumferential track for (actively) providing an at least one-dimensional crawler-like traveling motion along a structure having a predefined raster, especially along/at a ceiling structure, wherein the first and second tracks are fixedly arranged with respect to each other in crawler type vehicle being suspended by means of a plurality of suspension elements configured for coupling the vehicle to the structure, especially headlong at the (ceiling) structure, wherein the suspension elements are guided by the circumferential tracks when providing a crawler-type circumferential guiding/driving motion to/by the tracks, wherein the suspension elements are attached to the first circumferential track at predefined first longitudinal positions corresponding to the raster of the structure, wherein the suspension elements are aligned/oriented by the second circumferential track at predefined second longitudinal positions corresponding to the raster of the structure and respectively differing from the corresponding first longitudinal positions, wherein the circumferential tracks have a different shape/contour which differs with respect to each other at least in curved sections of the tracks in such a manner that a subset of the suspension elements are decoupled from resp. coupled into the structure when providing the circumferential guiding/driving motion, thereby moving the vehicle along the structure in at least one spatial direction, especially with the subset only including (those) suspension elements being momentarily arranged in a/the respective curved section of the tracks, especially use of the at least one drive unit in a vehicle as described above, especially for/in a method as described above.

The respective drive unit accommodating the tracks may also provide for (passive) decoupling kinematics for the suspension elements; i.e., actively driving the vehicle is one of several options of implementing the present invention.

BRIEF DESCRIPTION OF THE DRAWINGS

These and other aspects of the present invention will also be apparent from and elucidated with reference to the embodiments described hereinafter. Individual features disclosed in the embodiments can constitute, alone or in combination, an aspect of the present invention. Features of different embodiments can be carried over from one embodiment to another embodiment. In the drawings:

FIGS. 3A, 3B, 3C show in perspective views details of suspension elements of a ceiling vehicle according to one embodiment;

FIGS. 4A, 4B, 4C, 4D, 4E, 4F, 4G show in perspective views and in side views components of a ceiling vehicle according to a further embodiment;

DETAILED DESCRIPTION

Figure 1A:
FIGS. 1A, 1B, 1C, 1D, 1E, 1F, 1G, 1H, 1J, 1K, 1L, 1M, 1N, 1O show in perspective views and in side views components of a ceiling vehicle according to one embodiment.
Figure 1B:
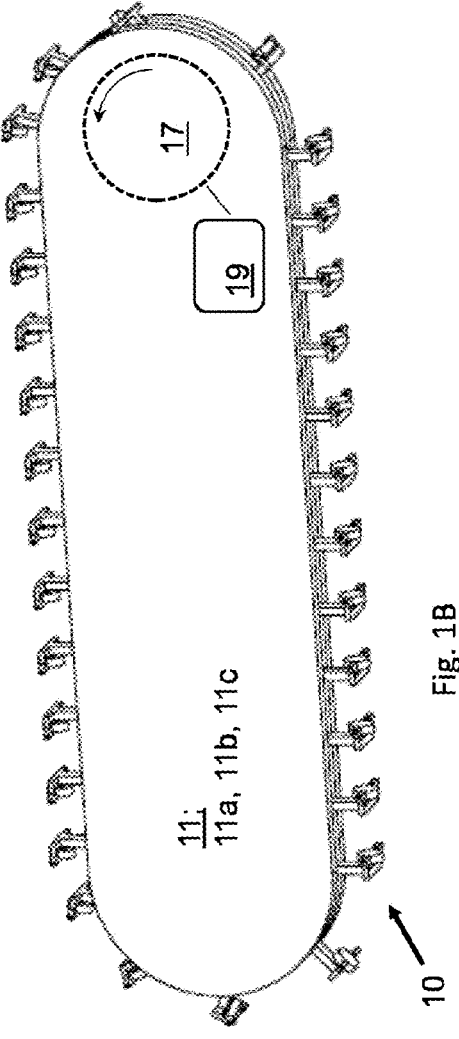

First, the reference signs are described in general terms; individual reference is made in connection with respective figures.

The present invention provides for a vehicle 10, especially a ceiling vehicle 10, having at least one drive unit 11 (especially crawler track-like), especially a first drive unit 11a and a further (second) drive unit 11b and optionally also a further (third) drive unit 11c. The vehicle 10 is configured for traveling along a ceiling structure 1 exhibiting a predefined raster 1a which is, e.g., defined by T-profiles resp. T-rails 1.1 or any such profile rails. The profiles 1.1 exhibit at least one wheel tread 1.2, and optionally, a power rail 1.3 providing for energy supply can be arranged at the profiles also. The vehicle 10 is coupled to the structure 1 and suspended via a plurality of suspension elements 13 (e.g. each including at least one chain element). A crawler type ceiling vehicle arrangement 100 is composed of at least one ceiling vehicle 10 and at least one ceiling structure 1.

The at least one drive unit 11 provides for a drive mechanism 11.1 (with or without motor(s) or actuator(s)) which allows for circumferential motion of the suspension elements 13 along circumferential tracks 12, namely simultaneously along a first and a second circumferential track 12a, 12b, which tracks exhibit individual shapes/contours XZa, XZb. Preferably, the tracks only extend two-dimensionally (2D), i.e. in a plane, and the shape is different at least in curved sections of the tracks. Each track 12a, 12b exhibits a parallel/linear section 12p (resp. two parallel sections) and a redirection/curved section 12r (resp. two curved sections). A lateral area resp. surface shell 11.2 of the at least one drive unit is preferably flat, plane, even, respectively on each lateral side. Such a configuration is also favourable in view of interconnection of several drive units.

According to one embodiment, the vehicle 10 exhibits at least one further (second) drive unit 11b exhibiting first and second circumferential tracks 12a, 12b and accommodating a plurality of further suspension elements 13b which are arranged mirror-inverted, with respect to the suspension elements 13 of the first drive unit 11a. The first and second drive units 11a, 11b provide for a traveling motion (e.g. by a synchronous guiding/driving motion of/to the suspension elements), and these drive units 11a, 11b can be interconnected, e.g. via crossbeams or the like. Also, the first and second drive units 11a, 11b may provide for different driving motions, e.g. in order to force a non-linear, but curved/curvilinear traveling motion. The desired/required traveling motion can be controlled via a control unit 30 which can be coupled to at least one motor or actuator 17 (which is optional). In particular, the vehicle can be provided as a kind of passive vehicle which traveling motion is induced by external forces; in such a configuration, the inventive kinematics provide for hanging/suspending the vehicle, but not for actively driving the vehicle for any traveling motion. The drive section may also comprise at least one gear unit 18 configured for interacting with the track(s) and at least one energy storage unit 19. A sensor arrangement 40, e.g. comprising position sensors and velocity sensors and/or weight sensors and/or gyroscopes, may provide sensor data to the control unit.

Each suspension element 13 exhibits a first pulley 13.1 and a second pulley 13.2, and optionally, a wheel 13.3 is provided at the free end of the suspension element 13 (bearing point P13). The first and second pulleys are arranged on a lever arm 13.5 in distance from/to each other (y-offset, longitudinal extension y13 of lever arm); the bearing point P13 resp. the wheel 13.3 is arranged at a protruding section resp. suspension arm 13.6 (z-offset). At the free end of the suspension arm, optionally, a current collector resp. power-slider 13.4 (conductive slider for energy transfer) is provided in an arrangement geometrically corresponding to a/the power rail 1.3 of the respective profile 1.1. The plurality of suspension elements 13 of a/the respective drive unit 11 can be interconnected via longitudinal connecting elements 15 which can ensure a closed loop 15a of interrelated suspension elements. Thus, the suspension elements 13 are coupled to the respective circumferential tracks.

In other words: The suspension elements preferably exhibit a wheel 13.3 performing a rolling motion on the profile, allowing for motion which is orthogonal to the motion predefined and evoked by the tracks, wherein the wheel is positioned orthogonally with respect to the first and second pulleys. Optionally, the wheel can be motorised e.g. by means of further actuators or motors. The first pulley 13.1 is engaged with the first or second circumferential track, thereby following that track; also, the second pulley 13.2 is engaged with the first or second circumferential track, thereby following that track (which is different from the track engaged by the first pulley, i.e. vice versa). Lever arm 13.5 is preferably L-shaped, especially provided as integral element in one piece (massive, solid).

Preferably, the structure 1 and its raster 1a is defined by profiles 1.1 being arranged in parallel and with similar distance (pitch) to adjacent profiles. Each profile is preferably configured to support geometries/surface(s) which are adequate for interaction with the wheel(s) of the suspension elements (e.g. T-profile, C-profile, L-profile, l-profile), and a series of such profiles preferably provides for a planar surface at least in sections.

By means of the circumferential tracks and the suspension elements, the (respective) drive unit provides for de-/coupling kinematics 20 which ensure both vertical motion kinematics 20a and non-circular pivot motion kinematics 20b. Thereby, de-/coupling of each suspension element can be effected via circumferential motion along the tracks without the need of any axial telescopic motion within each suspension element. I.e., the suspension element can be designed as purely mechanic unit.

In particular, in context with logistic tasks, the vehicle 10 may exhibit at least one hoist unit 50 providing for a traction mechanism 51 (especially with rope winch) and having at least one transmission means 53 (especially a rope).

In the following, the kinematics provided by the guiding/driving motion along the circumferential tracks is described in general, first:

The first pulley 13.1 of each suspension element 13 rotates about a first pulley axis X13.1 and defines a first guiding point G13.1 (coupling the first track and the respective suspension element), and vice versa, the corresponding point of the corresponding circumferential track defines that first guiding point G13.1 for each suspension element. Likewise, the second pulley 13.2 of each suspension element 13 rotates about a second pulley axis X13.2 (which is preferably aligned in parallel) and defines a second guiding point G13.2 (coupling the second track and the respective suspension element). When referring to the kinematics of each suspension element, an instantaneous centre of rotation Cr of each suspension element is defined by the axis X13.1 of the first pulley 13.1 being coupled to the first track 12a, wherein coupling/attachment/fixation can be ensured e.g. at the axial section between a/the suspension arm 13.6 and the first pulley 13.1 (cf. FIG. 3B). The two tracks 12a, 12b are arranged with respect to another in such a manner that the contacting/bearing point/area P13 of the respective suspension element 13 can be hooked or hitched on the ceiling structure. According to a preferred arrangement, the wheel 13.3 of each suspension element rotates about a wheel axis Y13.3 which is preferably aligned orthogonally to the first and second pulley axis X13.1, X13.2. Since each suspension element 13 is coupled to the tracks 12a, 12b in predefined positions, namely in a predefined first longitudinal position y12a via the first pulley 13.1 and in a predefined second longitudinal position y12b via the second pulley 13.2, when driving the tracks resp. when guiding the suspension elements along the tracks, the bearing point P13 at the free end of the suspension element 13 is guided according to the relative position/contour and distance of the tracks.

In the figures, (x) designates a/the first spatial direction (especially cross direction, especially direction of longitudinal extension of T-profiles), and (y) designates a/the second spatial direction (especially longitudinal direction or momentary driving direction of the drive units), and (z) designates a/the third spatial direction (especially vertical direction).

Figure 1C:
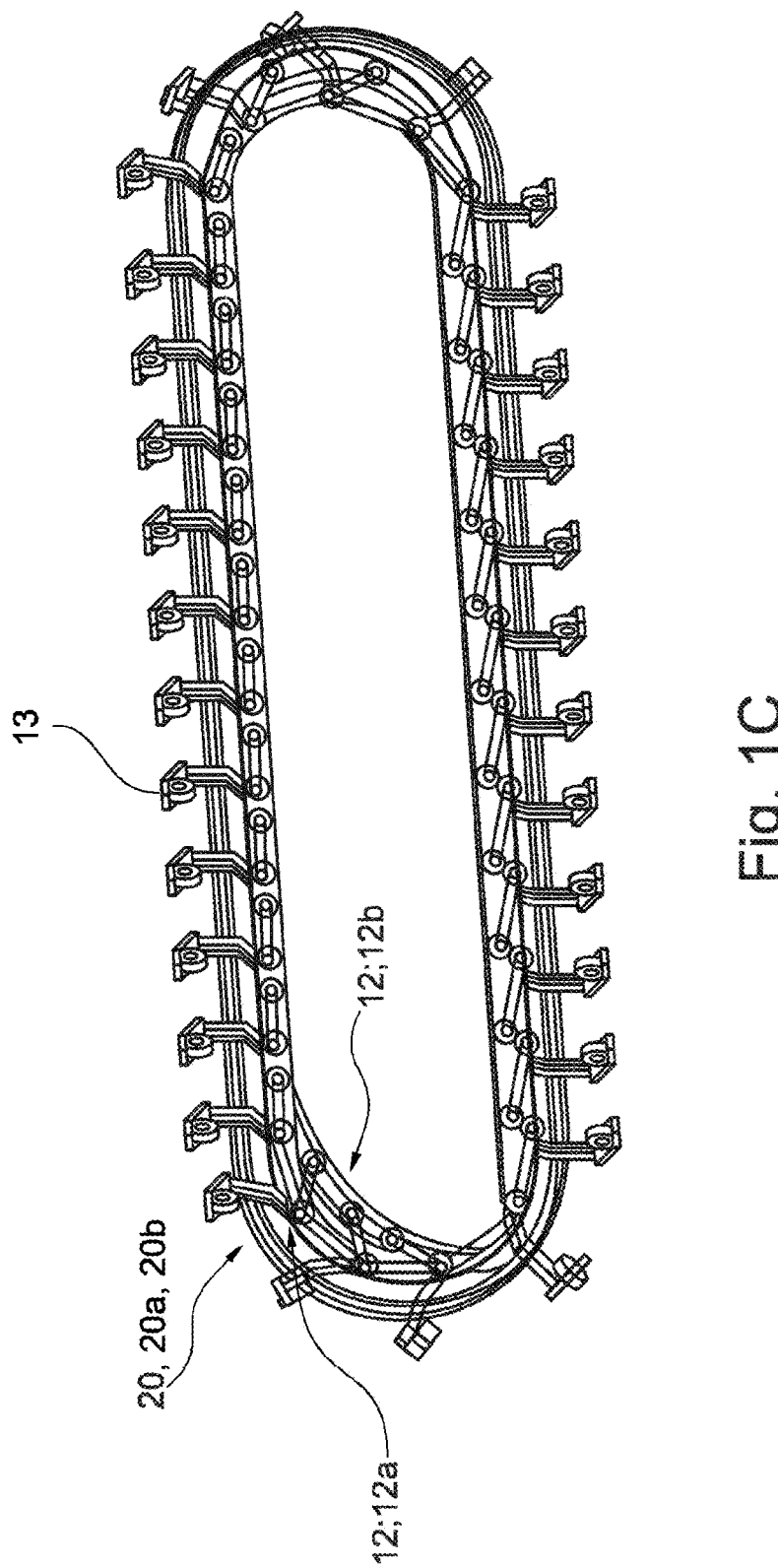
Figures 1D, 1E:
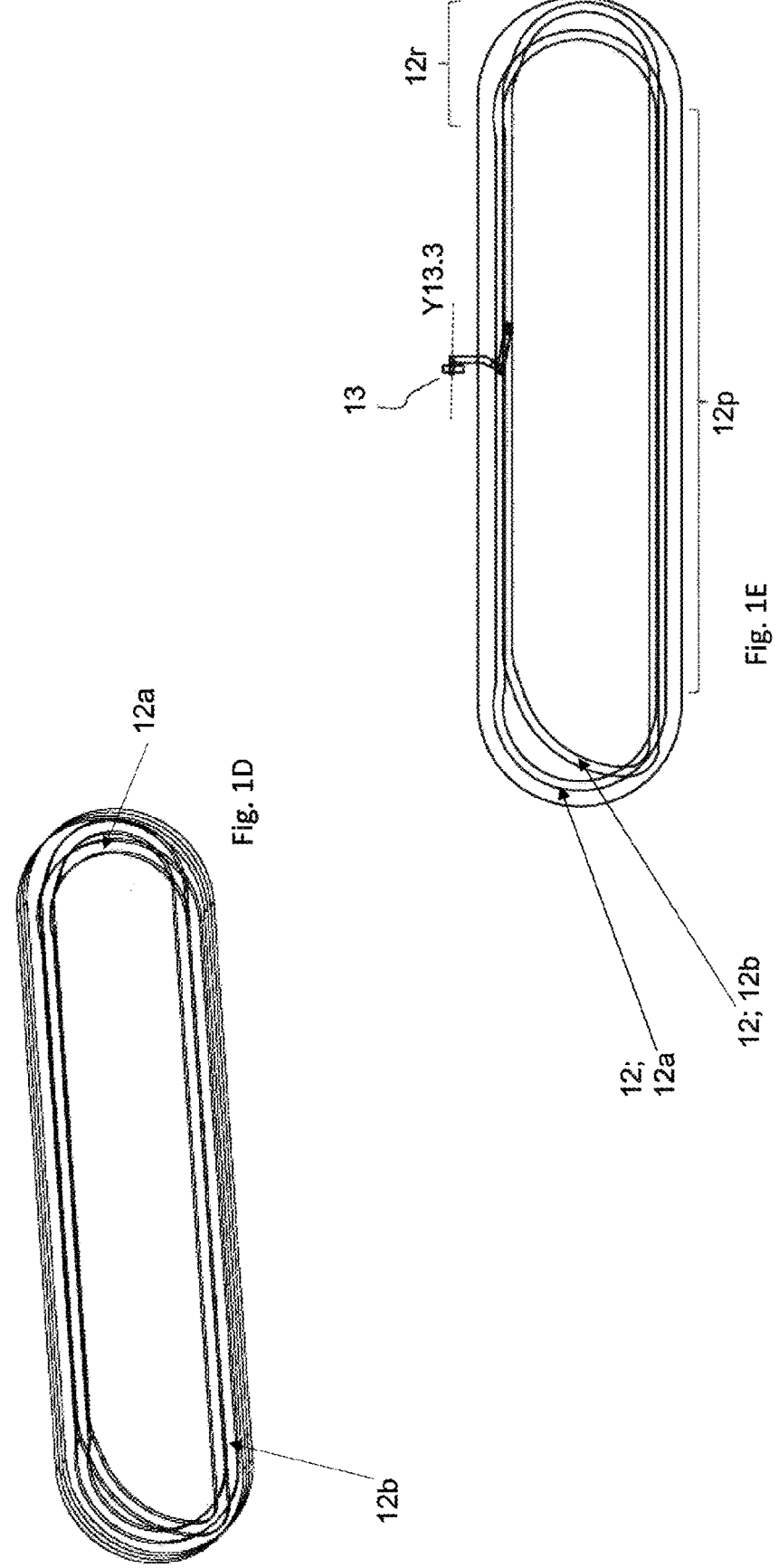

FIG. 1A shows a (ceiling) vehicle 10 exhibiting a drive unit 11 and suspension elements 13, wherein a subset of the suspension elements 13 is momentarily coupled to a/the ceiling structure 1, namely to T-profiles. The suspension elements 13 are guided (and optionally also actively driven) along two circumferential tracks (not shown, cf. FIG. 1C), and decoupling is carried out in curved sections of the tracks.

The vehicle 10 shown in FIG. 1A is suspended/hanging at a ceiling structure. Nonetheless, the vehicle 10 may also be suspended in a similar structure being arranged on the ground or at the wall. The vehicle is not necessarily provided in the form of a ceiling vehicle; rather, FIG. 1A illustrated an application/use at a ceiling structure.

FIG. 1B, 1C, 1D, 1E show separate components of the respective drive unit 11, 11a, 11b, 11c. At least one drive 17 (which is optional, i.e., which can be provided if active driving motion to the suspension elements is desired) provides for circumferential motion of the tracks 12a, 12b, especially by means of at least one gear unit 18 engaging the tracks. It is shown that the de-/coupling kinematics are provided within the curved sections 12r of the first and second circumferential tracks 12a, 12b. In contrast, within the parallel section(s) 12p, the suspension elements 13 remain in predefined relative positions at/with respect to the ceiling structure. In that section, the axis Y13.3 of the wheel 13.3 of the respective suspension element 13 is aligned parallel to the parallel section(s) 12p of the tracks.

Figure 4A:
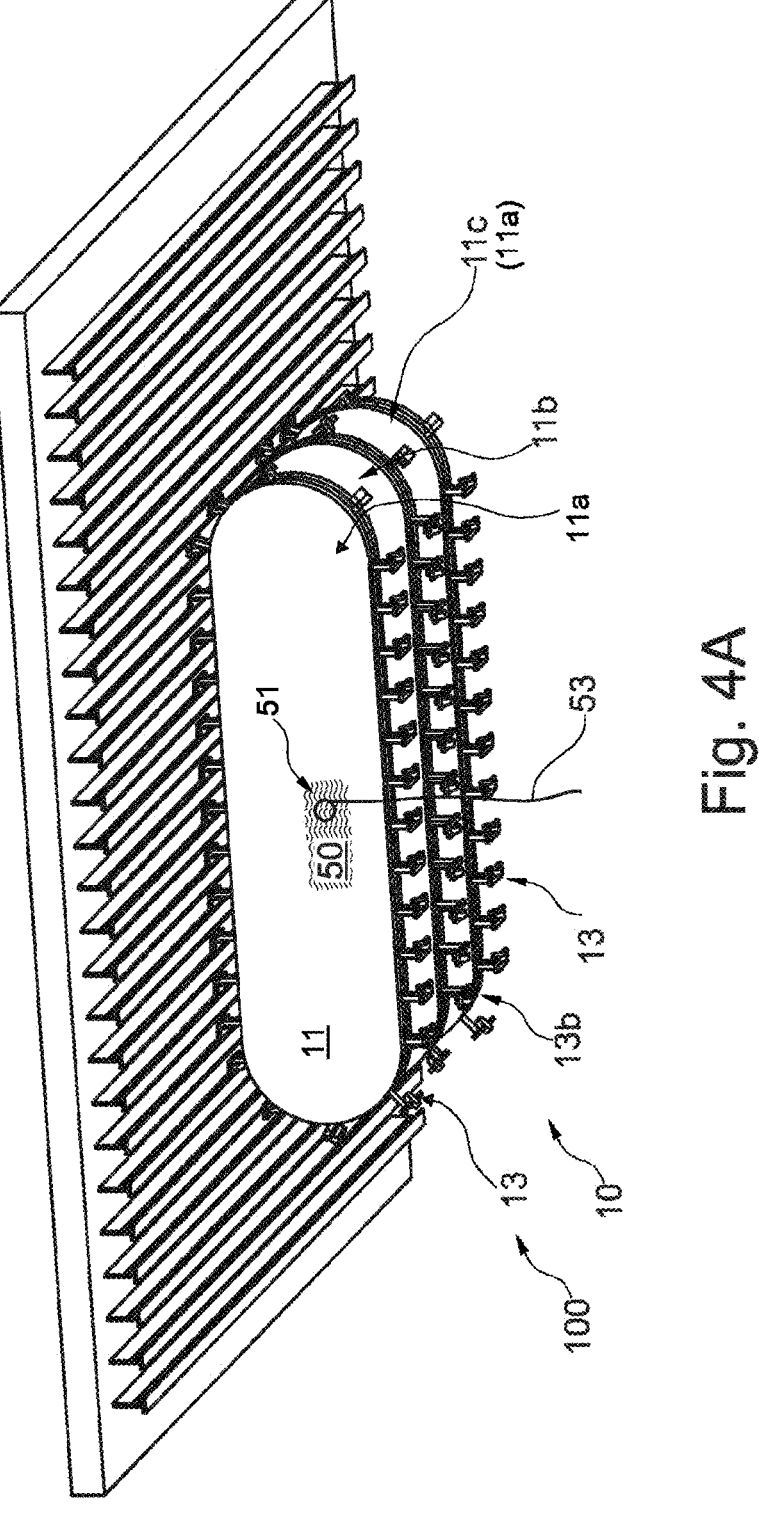
Figure 4G:
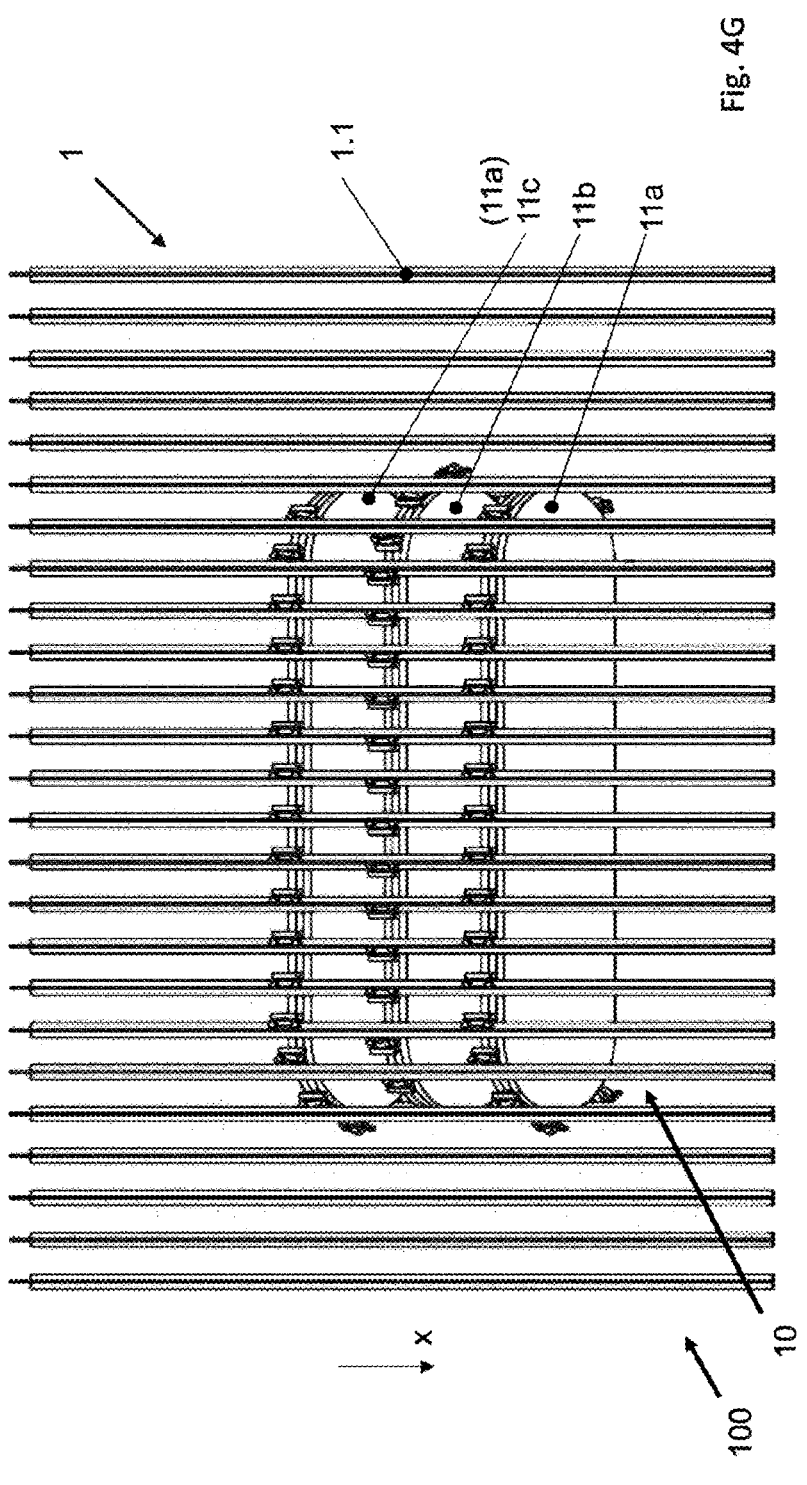
Figures 5A, 5B, 5C, 5D:
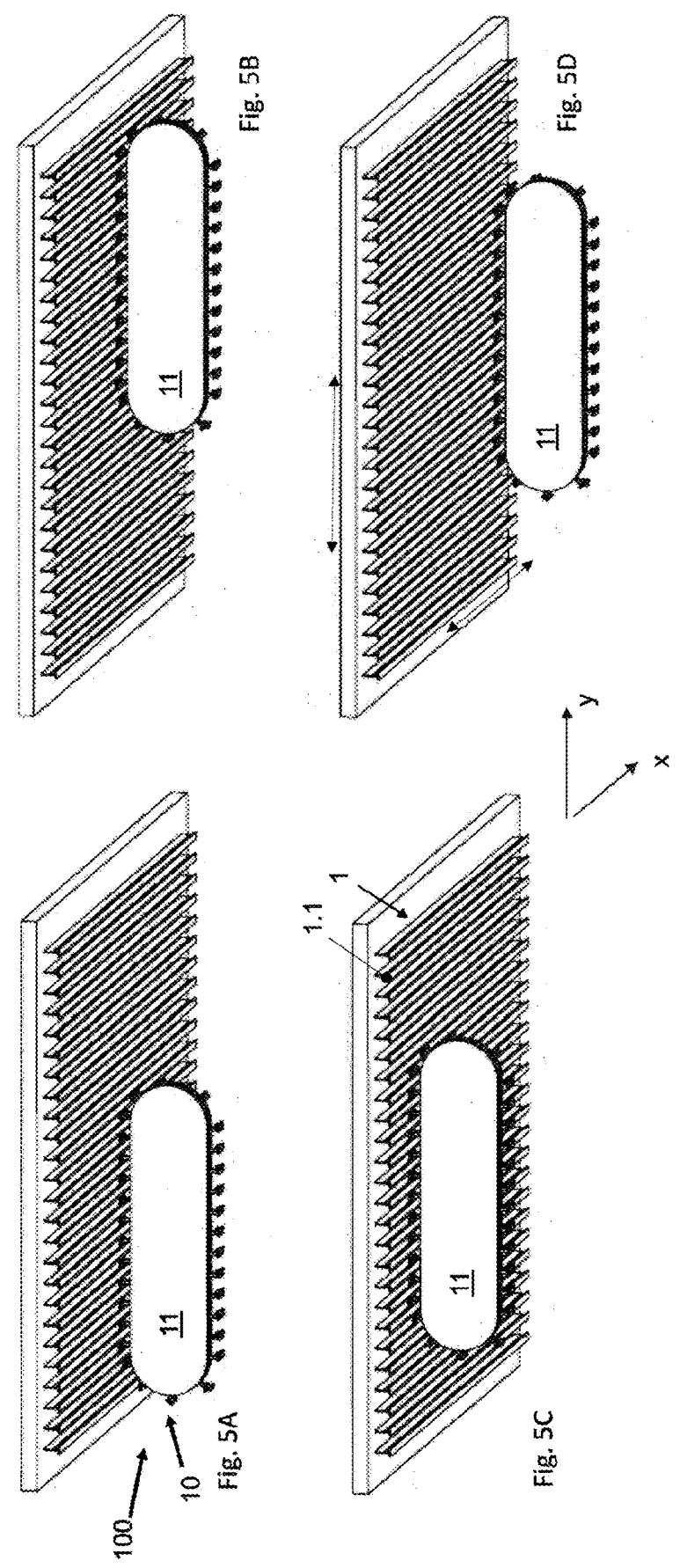
FIGS. 5A, 5B, 5C, 5D illustrate in different perspective views an exemplary path of a motion of a ceiling vehicle according to one of the embodiments.

In case the vehicle exhibits several drive units 11a, 11b, some of these components may also be arranged in a mirror-inverted manner, especially the suspension elements (cf. FIG. 4A). Thus, any detailed description of the figures relating to any separate/single component of the respective drive unit may also describe a similar configuration of any further drive units or any further redundant components.

Figure 1F:
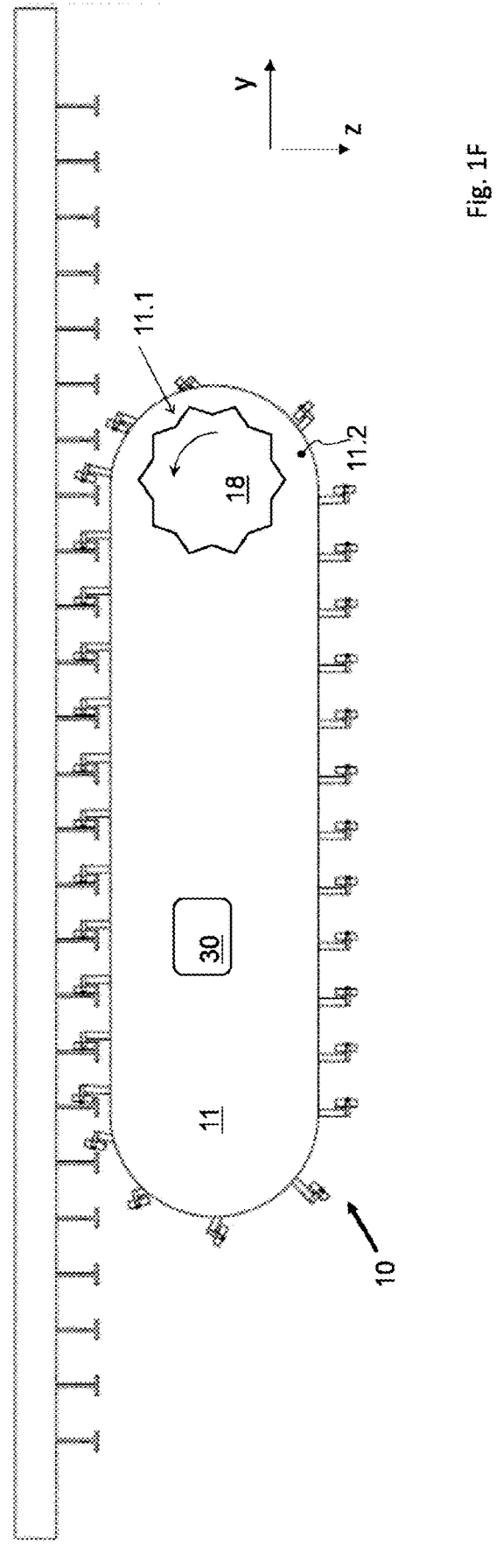
Figure 1G:
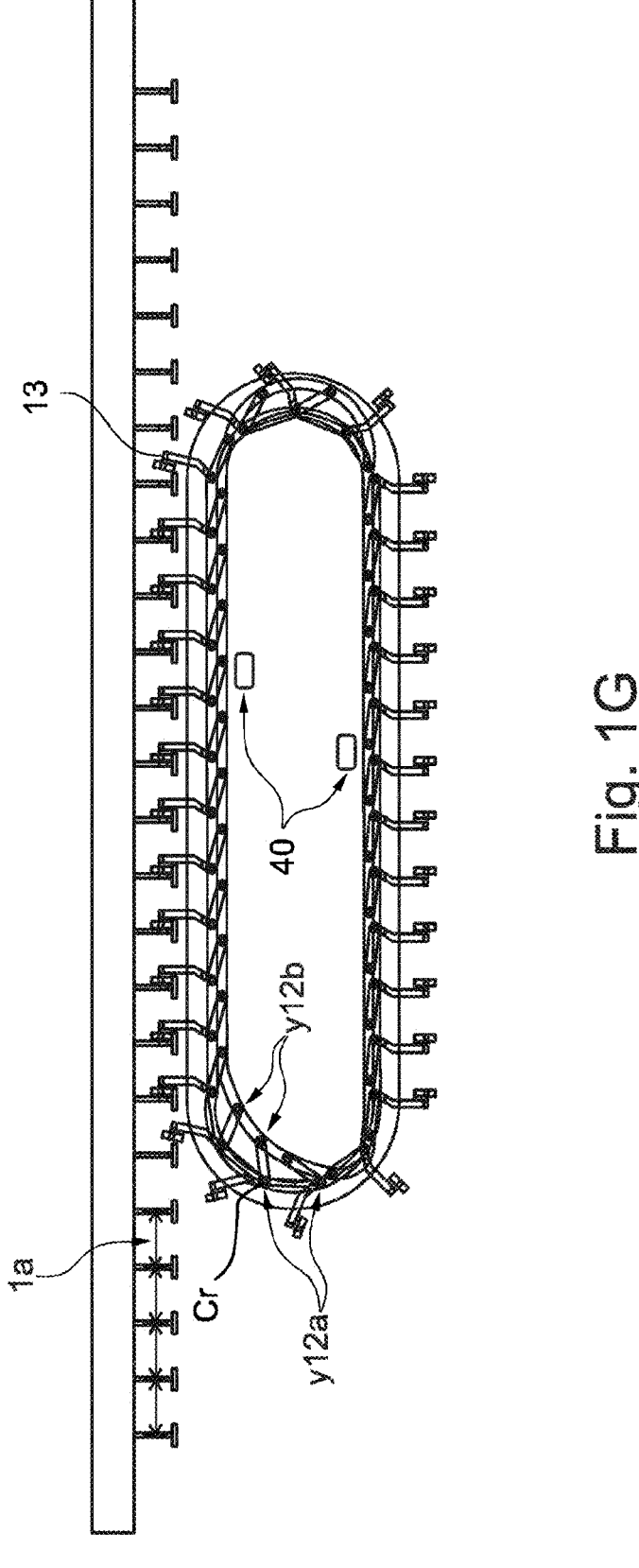
Figures 1H, 1J, 1K, 1L, 1M, 1N, 1O:
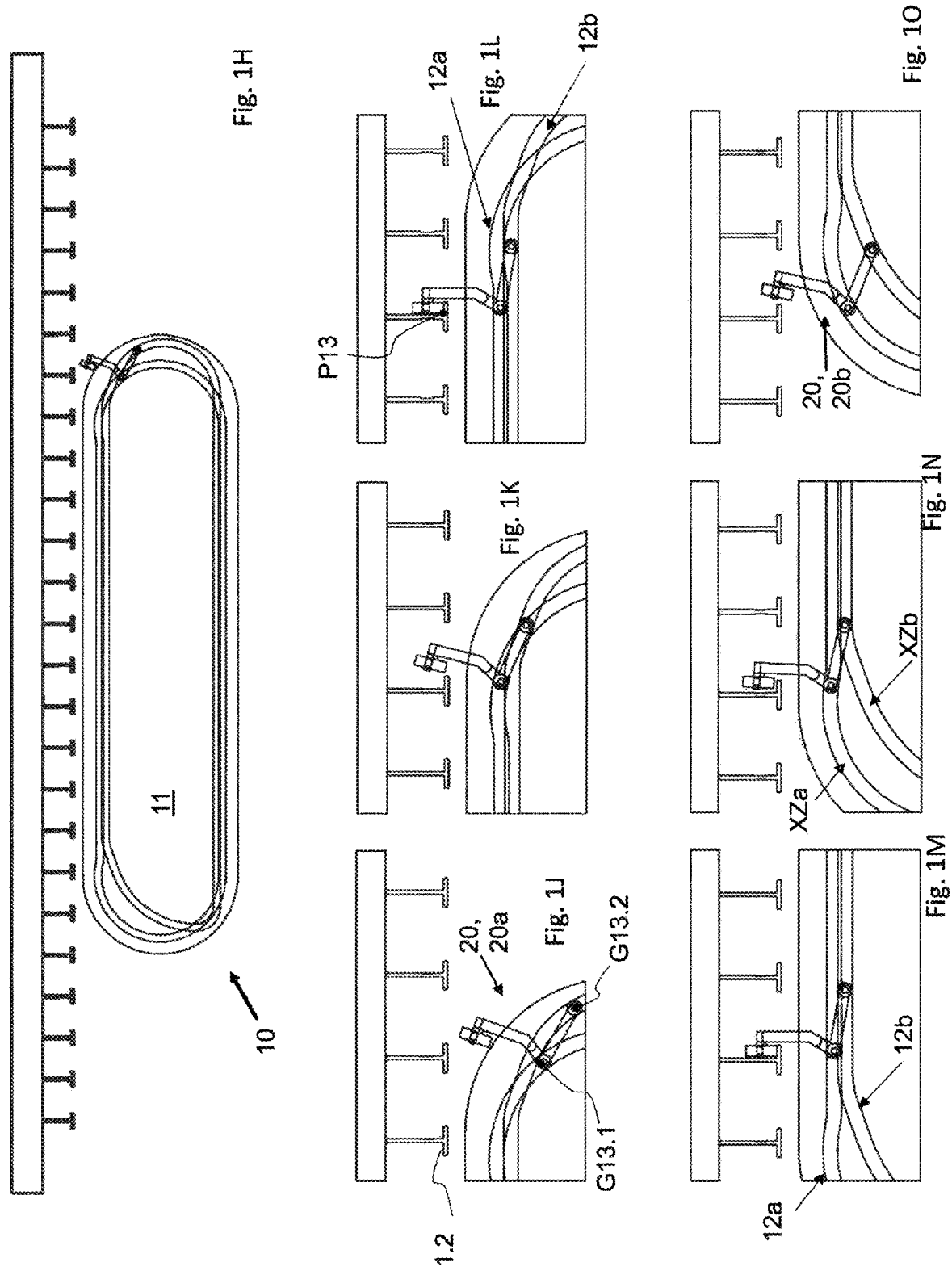

FIG. 1F, 1G illustrate the curved sections 12r in more detail; it can be seen that both the radius of curvature and the distance of the tracks with respect to each other deviates/changes in value and direction, thereby effecting a pivot motion of the suspension arm 13.6 (protruding section) and the wheel 13.3 resp. bearing point P13 of the respective suspension element 13 (especially pivoting within the plane yz as shown in FIG. 1F and pivoting about an x-axis and around the instantaneous centre of rotation Cr). Thus, both vertical motion kinematics 20a and non-circular pivot motion kinematics 20b can be provided by means of rigid/stiff components being guided/driven along two circumferential tracks with different shape/contour.

FIG. 1H, 1J, 1K, 1L, 1M, 1N, 1O show some more details of the de-/coupling kinematics 20. In particular, it can be seen that the first track 12*a* has a curvature bent up (upwards), thereby effecting a slight lifting of the wheel 13.3 from the wheel tread 1.2, namely when the first pulley 13.1 is passing that section. In particular, apart from one single section, the shape/contour XZb of the second circumferential track 12*b* runs (is arranged) within the shape/contour XZa of the first circumferential track 12*a*.

Figure 2B:
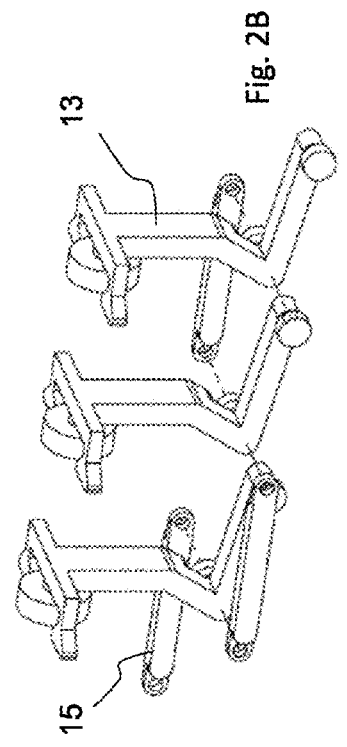
FIGS. 2A, 2B, 2C show in perspective views an arrangement of suspension elements and respective arrangement along a circumferential track of a ceiling vehicle according to one embodiment.
Figure 2A:
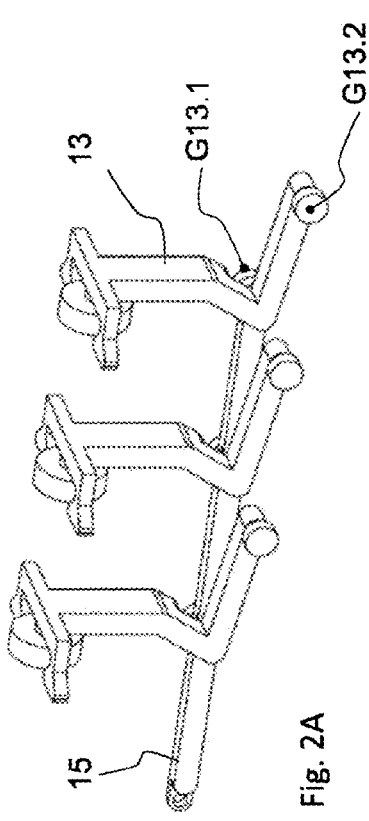
Figure 2C:
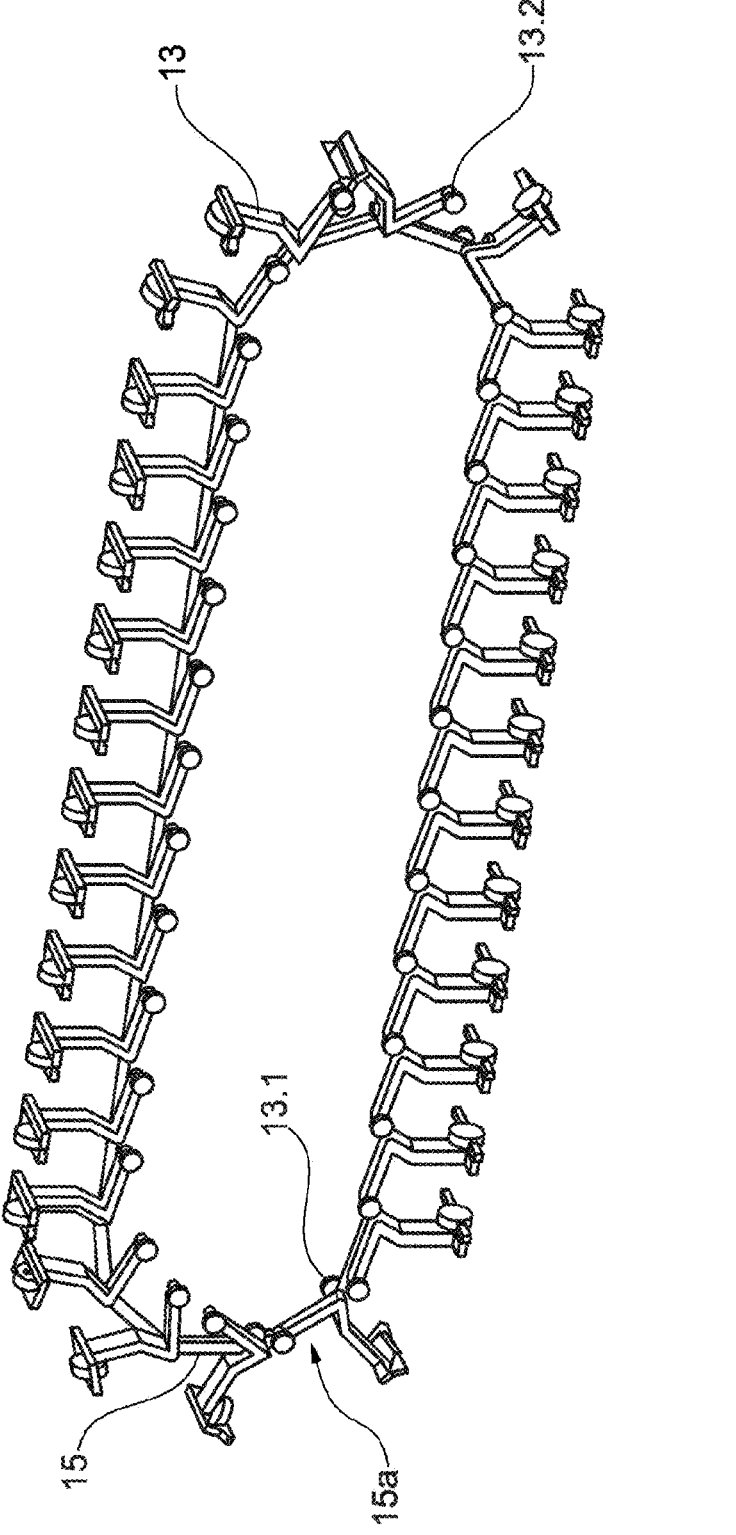

FIG. 2A, 2B, 2C show a plurality of suspension elements 13 being interconnected via longitudinal connecting elements 15 which thereby ensure a closed loop 15*a* of interrelated suspension elements. The suspension elements 13 are coupled to the respective circumferential tracks 12*a*, 12*b* via the first and second pulleys 13.1, 13.2.

In the embodiment shown in FIG. 2, the first and second pulleys 13.1, 13.2 are arranged on opposite lateral sides of the respective suspension element 13. Thus, the closed loop 15*a* of interrelated suspension elements is arranged between the first and second tracks 12*a*, 12*b* which extend on both lateral sides of the closed loop 15*a*.

The tracks 12*a*, 12*b* can be made of any kind of rail guide system components, in particular including at least one chain, belt, cable or the like traction or transmission means. The tracks 12*a*, 12*b* may comprise different guide/rail sections coupled together, each exhibiting a different radius of curvature or being linear. Also, the tracks 12*a*, 12*b* can be formed/made by on single continuous/coherent rail.

FIG. 3A, 3B, 3C show some more details of the suspension elements 13 and the connecting elements 15. E.g., the connecting elements 15 are coupled to the lever arm 13.5 at the axis X13.1 if the first pulley 13.1, thereby facilitating pivot motion about that axis (resp. around the respective instantaneous centre of rotation Cr).

FIG. 4A, 4B, 4C, 4D, 4E, 4F, 4G show an embodiment of a vehicle 10 exhibiting three drive units 11*a*, 11*b*, 11*c* which can be interrelated/connected e.g. via cross-beams or the like. In contrast to the configuration at the first drive unit 11*a*, the suspension elements 13*b* of the second drive unit 11*b* are arranged in mirror-inverted manner, but the suspension elements 13 of the third drive unit 11*c* are arranged in the same manner as the suspension elements 13 of the first drive unit 11*a*. As can be seen in FIG. 4E, 4F, that configuration allows for a really good security and stability level (both types of suspension elements 13, 13*b* are guided along the T-profiles, but on different lateral sides of the T-profiles). Alternatively, the vehicle 10 may only comprise two drive units 11*a*, 11*b*.

FIG. 5A, 5B, 5C, 5D show different kinds of traveling motions which can be effected by means of the vehicle 10 described herein. As already described further above, the present invention allows for two-dimensional traveling motion both in a first spatial direction (x) corresponding to the longitudinal direction/extension of the T-profiles 1.1 (dashed line arrow), and in a second spatial direction (y) corresponding to the driving direction resp. to the direction/extension of the tracks (dotted line arrow).

It should be mentioned that the T-profiles shown in the figures may also be provided as other kinds of profile rails; i.e., the inventive mechanism/kinematics is/are not limited to use of T-profiles only; rather, the skilled person is aware of the fact that also other profiles offering adequate suspension for the suspension elements and optionally also a guiding track to the wheels can be used.

In the following, further aspects/details of embodiments of the present invention are described in more detail. For any reference signs or elements/components or aspects not explicitly mentioned/described, it is referred to above mentioned embodiments, respectively. The embodiments described in the following passages exhibit a first drive unit comprising a chain drive, and the first circumferential track comprises a chain (with a closed loop of interrelated chain elements arranging the corresponding suspension elements and optionally also arranging counter bearing elements), and the longitudinal connecting elements of that first drive unit are provided in the form of chain elements.

Figure 6A:
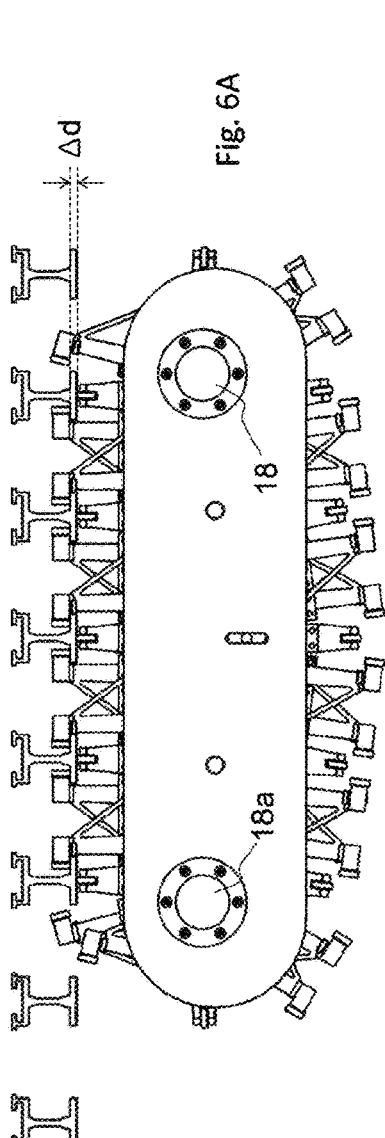
FIGS. 6A, 6B show, in side views, components of a ceiling vehicle according to two further embodiments (full suspension, and suspension with respect to vertical forces of inertia and lateral forces)
Figure 6B:
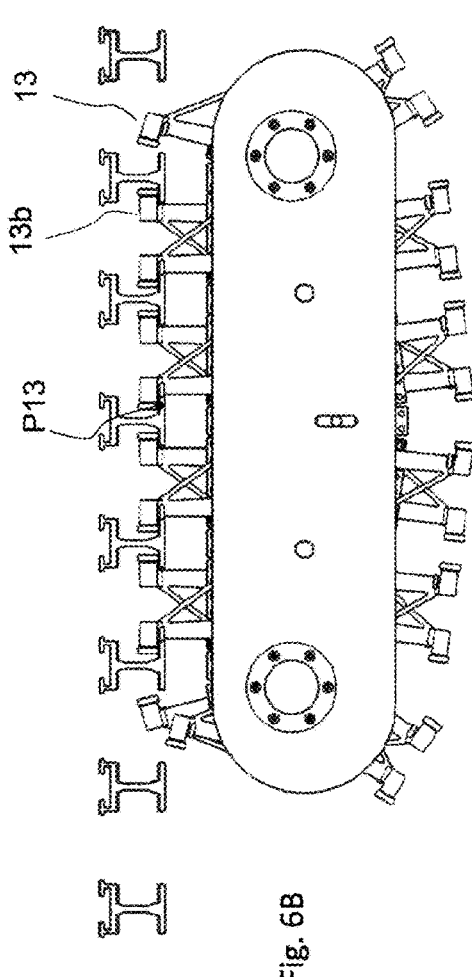

FIG. 6A shows a vehicle exhibiting means for avoiding any relative motion of the vehicle with respect to the structure (full suspension especially also in view of any relative motion orthogonally/normally with respect to the structure), and FIG. 6B shows a configuration which at least ensures secure the suspension in view of vertical forces of inertia and lateral forces (suspension devoid of counter bearings).

Figures 7A, 7B:
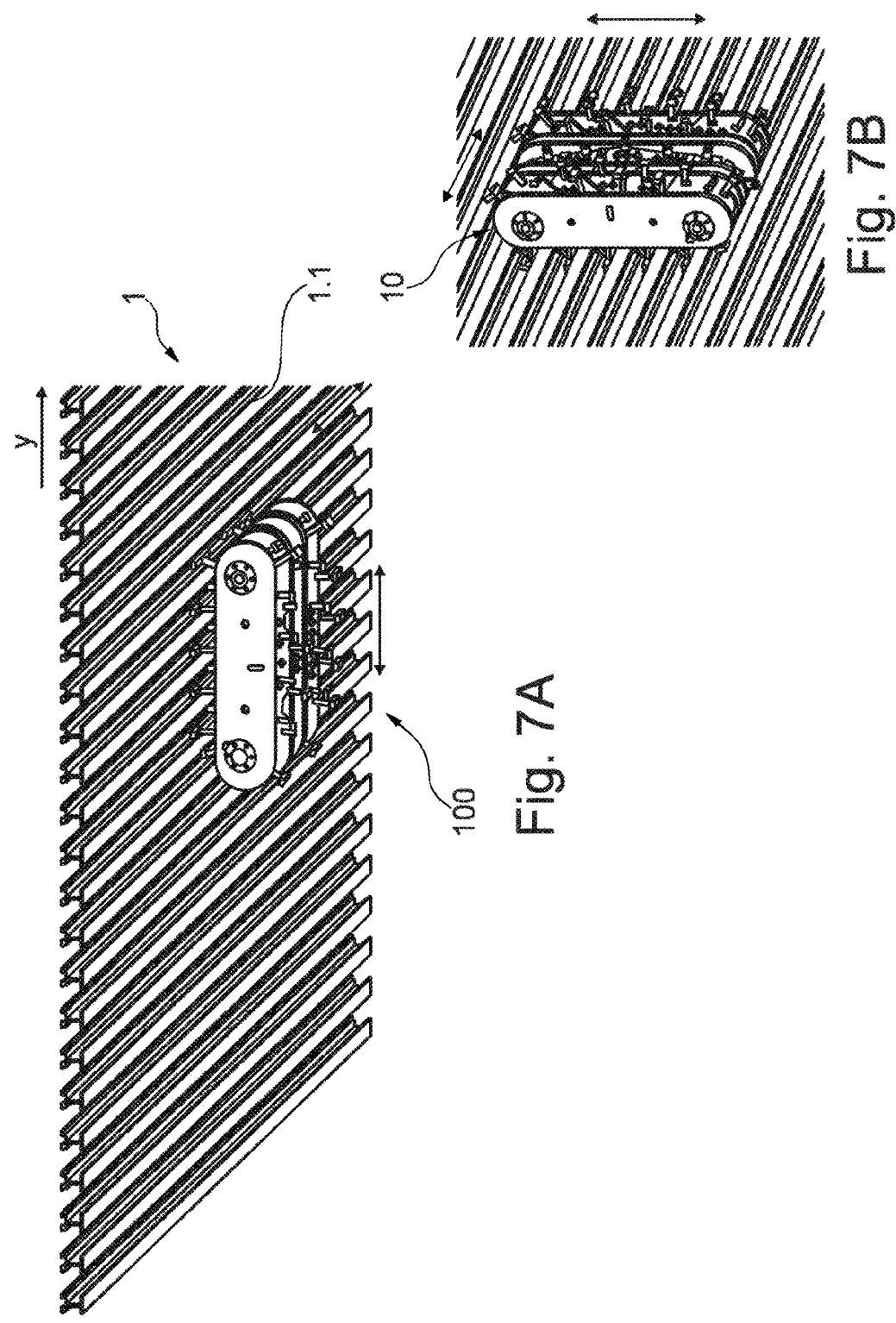
FIGS. 7A, 7B, 7C, 7D illustrate in different perspective views exemplary paths of motion (orientations of operation) of a ceiling vehicle according to one of the embodiments.
Figures 7C, 7D:
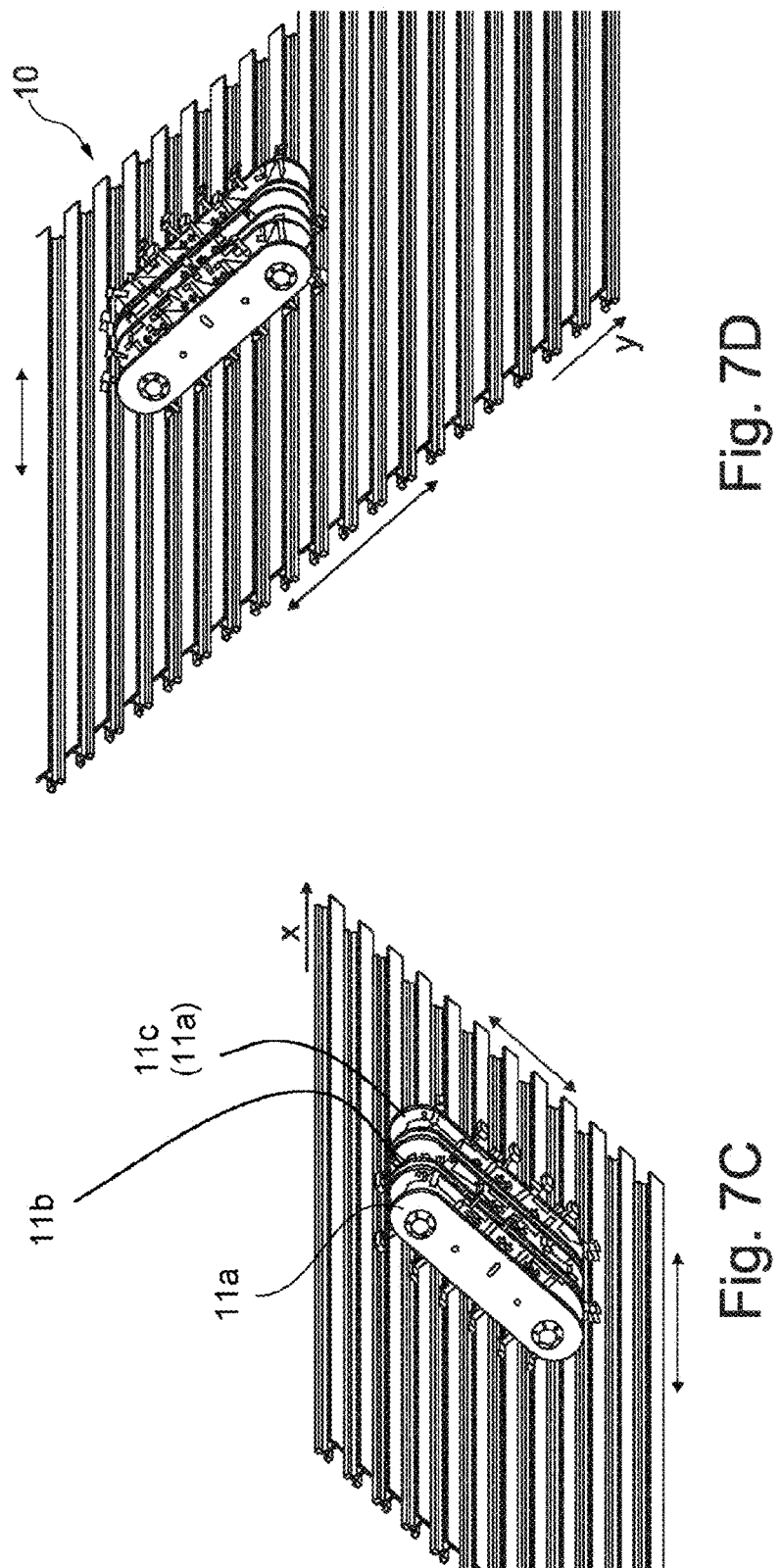

FIGS. 7A, 7B, 7C, 7D illustrate a ceiling vehicle arrangement 100 comprising a ceiling vehicle 10 exhibiting three drive units 11*a*, 11*b*, 11*c*. As already described further above, the present invention allows for two-dimensional traveling motion both in a first spatial direction corresponding to the longitudinal direction/extension of the T-profiles 1.1 (dashed line arrow), and in a second spatial direction corresponding to the driving direction resp. to the direction/extension of the tracks (dotted line arrow). Depending on the orientation of the structure/T-profiles 1.1, the first and/or second spatial direction may also comprise a vertical (z-) component, as illustrated in FIG. 7C, 7D (inclined plane/level).

Therein, coordinates x, y shown in the figures in context with inclined planes refer to the longitudinal extension (x) of the (ceiling) structure.

The vehicle 10 shown in FIG. 7A is suspended/hanging at a ceiling structure. Nonetheless, the vehicle 10 may also be suspended in a similar structure being arranged on the ground or at the wall. The vehicle is not necessarily provided in the form of a ceiling vehicle; rather, FIG. 7A illustrated an application/use at a ceiling structure. Same applies for any further figure of the present disclosure illustrating an application/use at a ceiling structure only as an example.

Figures 8A, 8B:
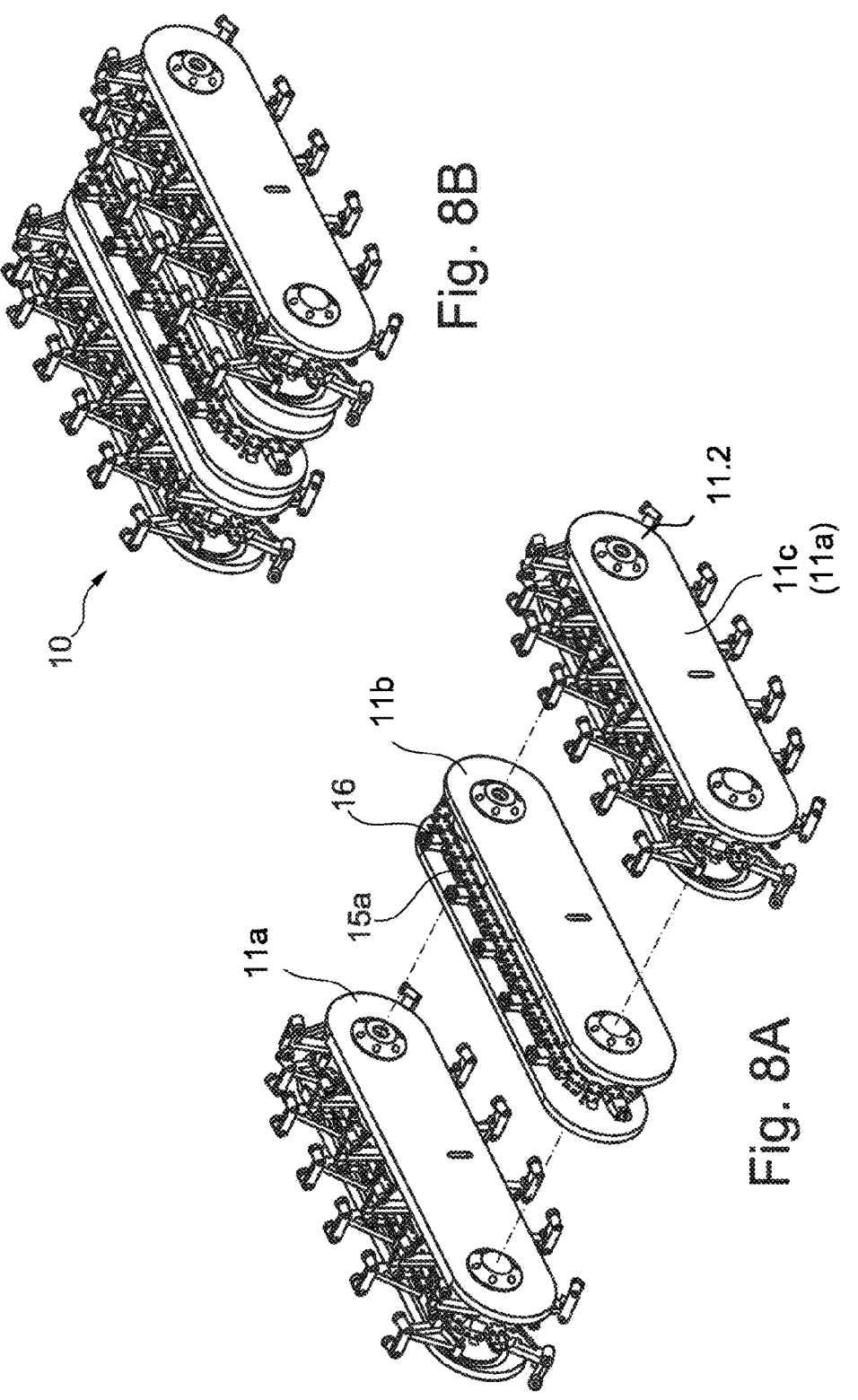
FIGS. 8A, 8B, 9A, 9B show in perspective views ceiling vehicles according to further embodiments (with and without counter bearing)
Figures 9A, 9B:
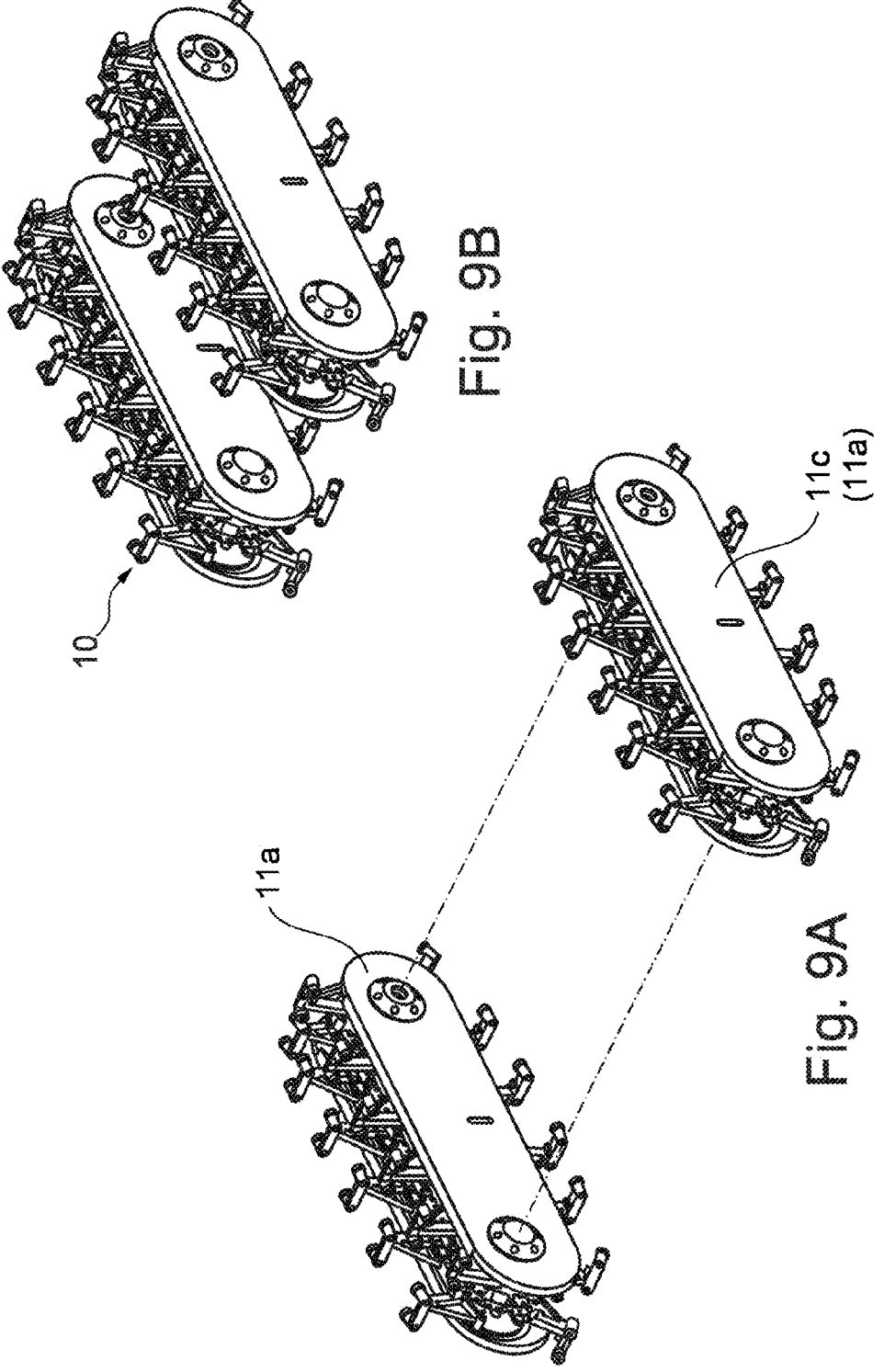

FIGS. 8A, 8B show some more details of a ceiling vehicle 10 exhibiting three drive units 11*a*, 11*b*, 11*c* drive units arranged laterally with respect to each other, wherein the drive unit 11*b* arranged there between (in the middle) does not exhibit any suspension elements but counter bearings 16, and FIGS. 9A, 9B show some more details of a ceiling vehicle 10 exhibiting two drive units 11*a*, 11*c* (each without counter bearing). In the embodiment shown in FIG. 8, the second drive unit 11*b* provides for counter bearings 16 which are coupled to the chain 15*a*, i.e., the first circumferential track provides for positioning and motion of the counter bearings 16. It should be noted that in the embodiment shown in the figures, theses counter bearings 16 are intended for interfering with the structure only at a face side, and therefore, no de-/coupling kinematics are provided in context with these counter bearings 16. Therefore, there is no need for provision of any further second circumferential track at/for the second drive unit 11*b* arranged in the middle. Thus, in this embodiment, the second drive unit 11*b* arranged in the middle and accommodating (only) the counter bearings only exhibits a/the first circumferential track.

Figures 10A, 10B:
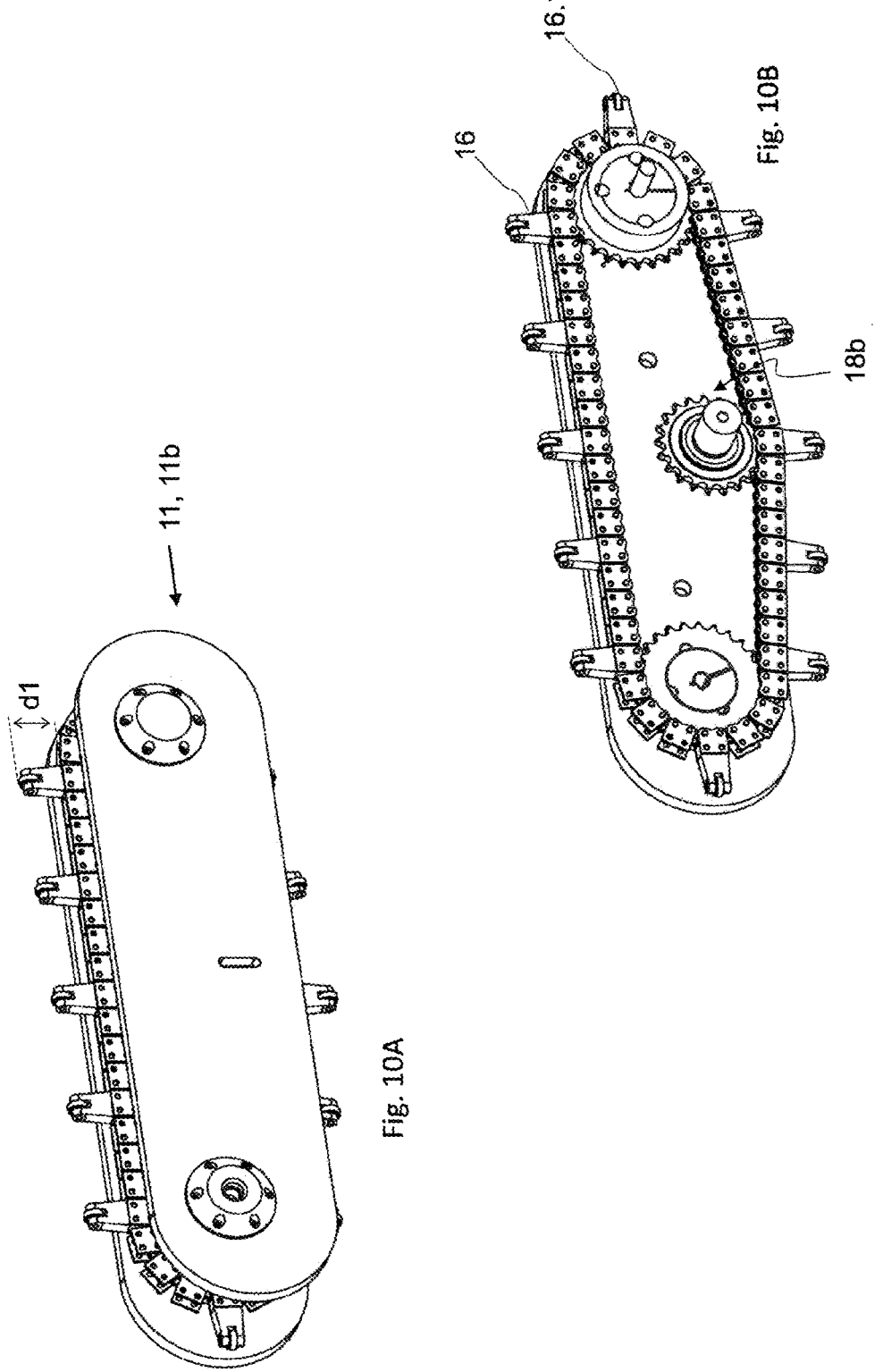
FIGS. 10A, 10B show in perspective views a ceiling vehicle according to a further embodiment.

FIGS. 10A, 10B show some details of a drive unit 11, 11*b* only accommodating counter bearings but no suspension elements.

Figure 13:
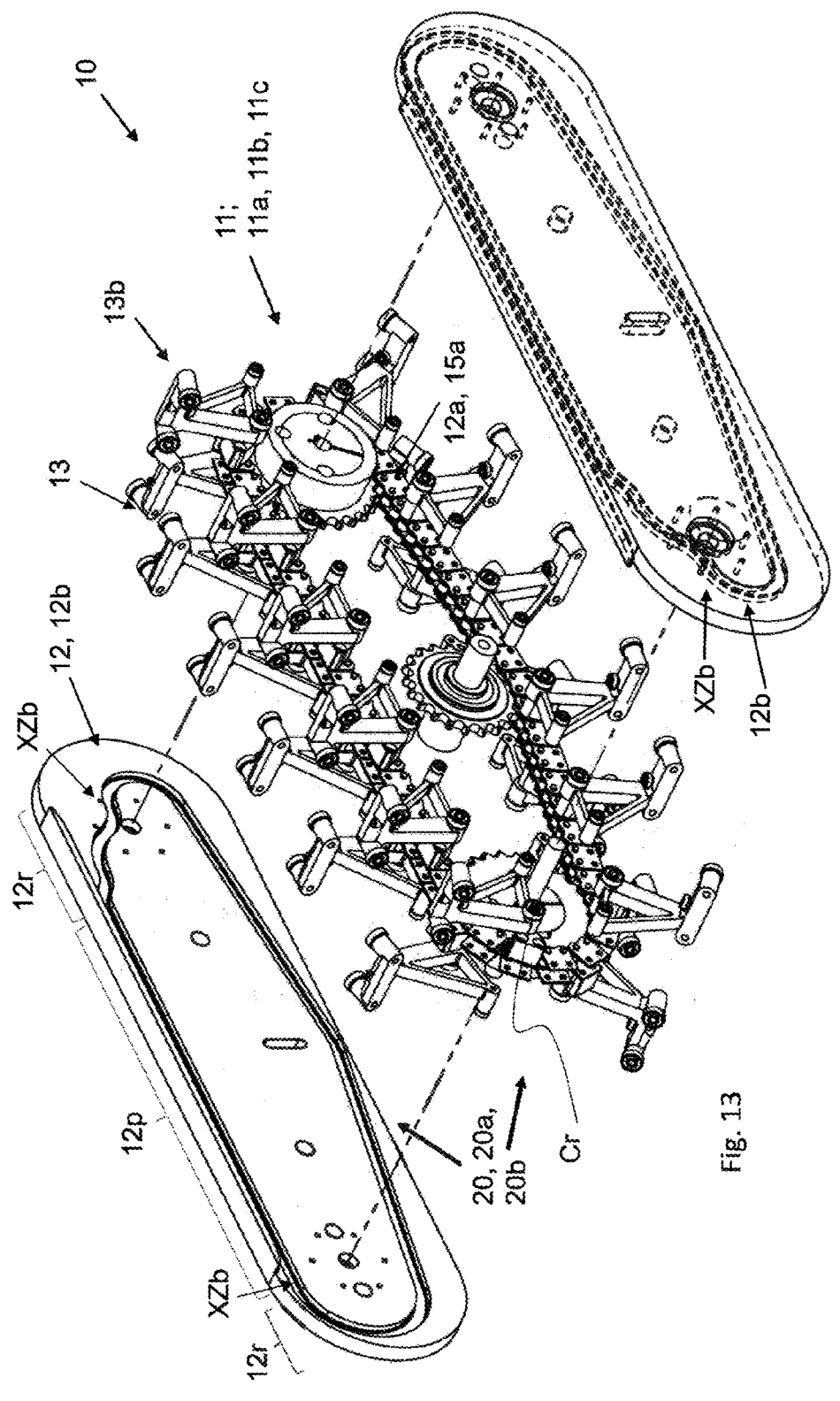
FIG. 13 shows in a perspective view details of a ceiling vehicle according to embodiments, especially according to the embodiment shown in FIG. 10.
Figures 14A, 14B:

FIGS. 11A, 11B, 11C and FIGS. 12A, 12B and FIG. 13 and FIGS. 14A, 14B show some kinematic aspects of drive units accommodating/arranging/guiding both suspension elements 13 and further suspension elements 13*b*. FIG. 13 also illustrates that one (each) drive unit 11 may comprise the first circumferential track (here: provided/defined by the chain 15*a*) and two second circumferential tracks 12*b*, wherein these two second circumferential tracks 12*b* are arranged asymmetrically, i.e., the shape/contour XZb is asymmetrical. Such an arrangement also allows for providing de-/coupling kinematics for both a plurality of suspension elements 13 and a plurality of further suspension elements 13*b*, especially in such a manner that both types of suspension elements 13, 13*b* may interact and engage in the same (but asymmetrical) manner with the structure 1, especially at the same profile rail at opposite lateral sides, respectively. Such an arrangement may also ensure a high security and stability level already by means of one single drive unit 11. Thus, scaling (two, three or even more) of the drive units is realizable in even more flexible manner, and individual arrangements can be optimized for each application.

It should be noted that the first circumferential track resp. a/the chain may/can provide for guiding and driving both the suspension elements 13 and the further suspension elements 13*b*; both types of suspension elements 13, 13*b* can be coupled, e.g., via a protruding axial section (guiding bolt or shaft) 13.7 to the chain structure (cf. FIG. 16B) which protrudes vis-a-vis of the first pulley 13.1, especially along its axis X13.1. In particular, the suspension elements 13 and the further suspension elements 13*b* are arranged with longitudinal offset (y) and mirror-inverted on both sides of the chain 15*a*. In particular, the longitudinal distance (y) of the respective suspension element 13 and the respective further suspension element 13*b* of a respective pair of suspension elements 13, 13*b* corresponds to the extension in cross direction (y) of each element/profile of the (ceiling) structure.

Figures 15, 16A, 16B:
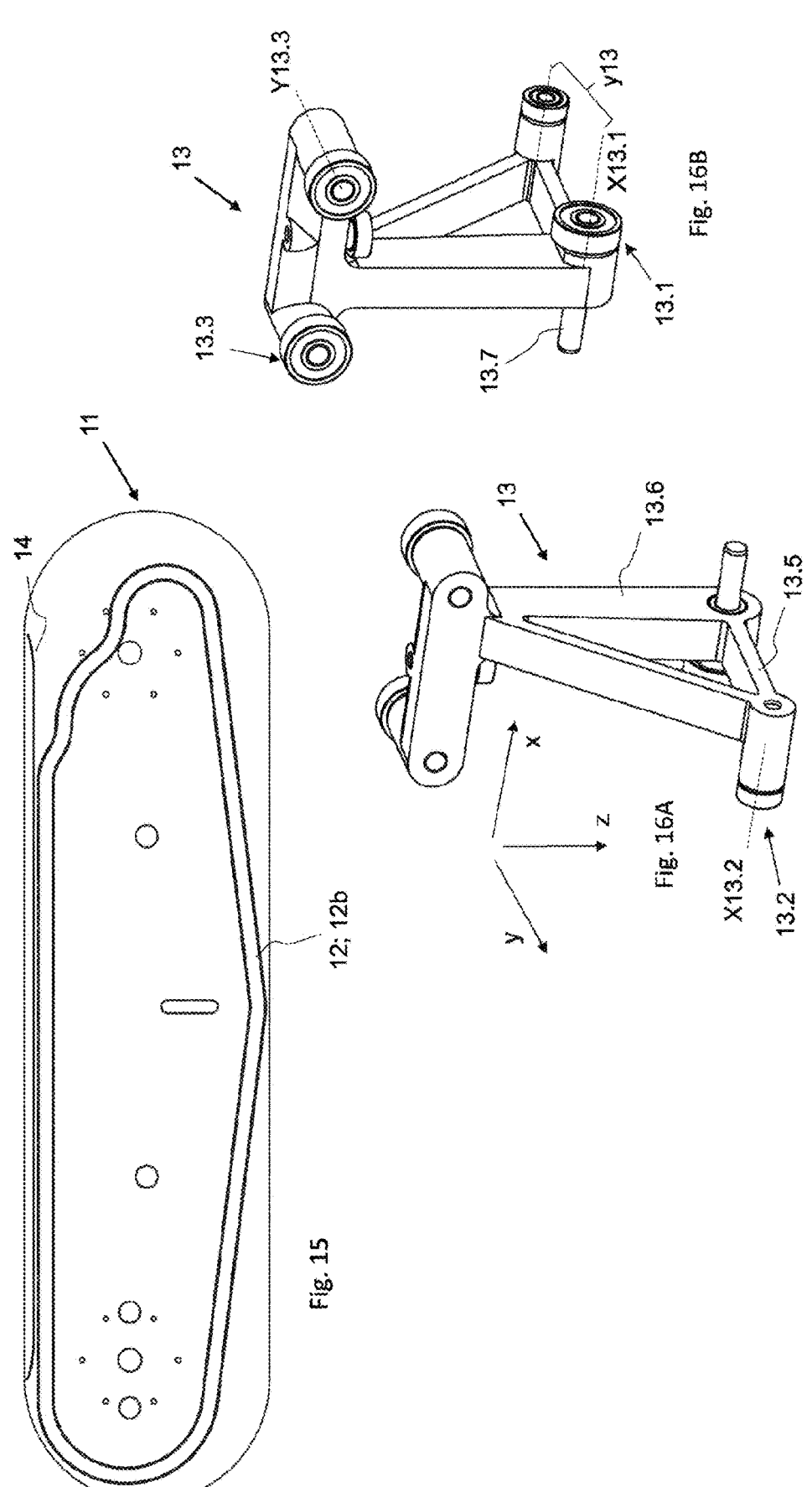
FIG. 15 shows in a side view components of a drive unit of a ceiling vehicle according to embodiments, especially according to the embodiment shown in FIG. 10.
FIGS. 16A, 16B show in perspective views some of the details of suspension elements of a ceiling vehicle according to embodiments, especially according to the embodiment shown in FIG. 10.

FIG. 15 also shows a guiding plank or rail 14 allowing for guiding the first circumferential track resp. the chain more precisely.

FIGS. 16A, 16B show a further embodiment of suspension elements 13, wherein in comparison with the suspension elements described above in context with FIG. 3, these suspension elements exhibit two wheels or pulleys 13.3 arranged and configured for interacting with the structure 1, and these suspension elements may also exhibit a further pulley which is suspended around an axis extending in the z-direction (as shown in FIG. 16B). That optional further pulley may ensure further/improved support and guiding with respect to the structure.

Figures 11A, 11B, 11C:
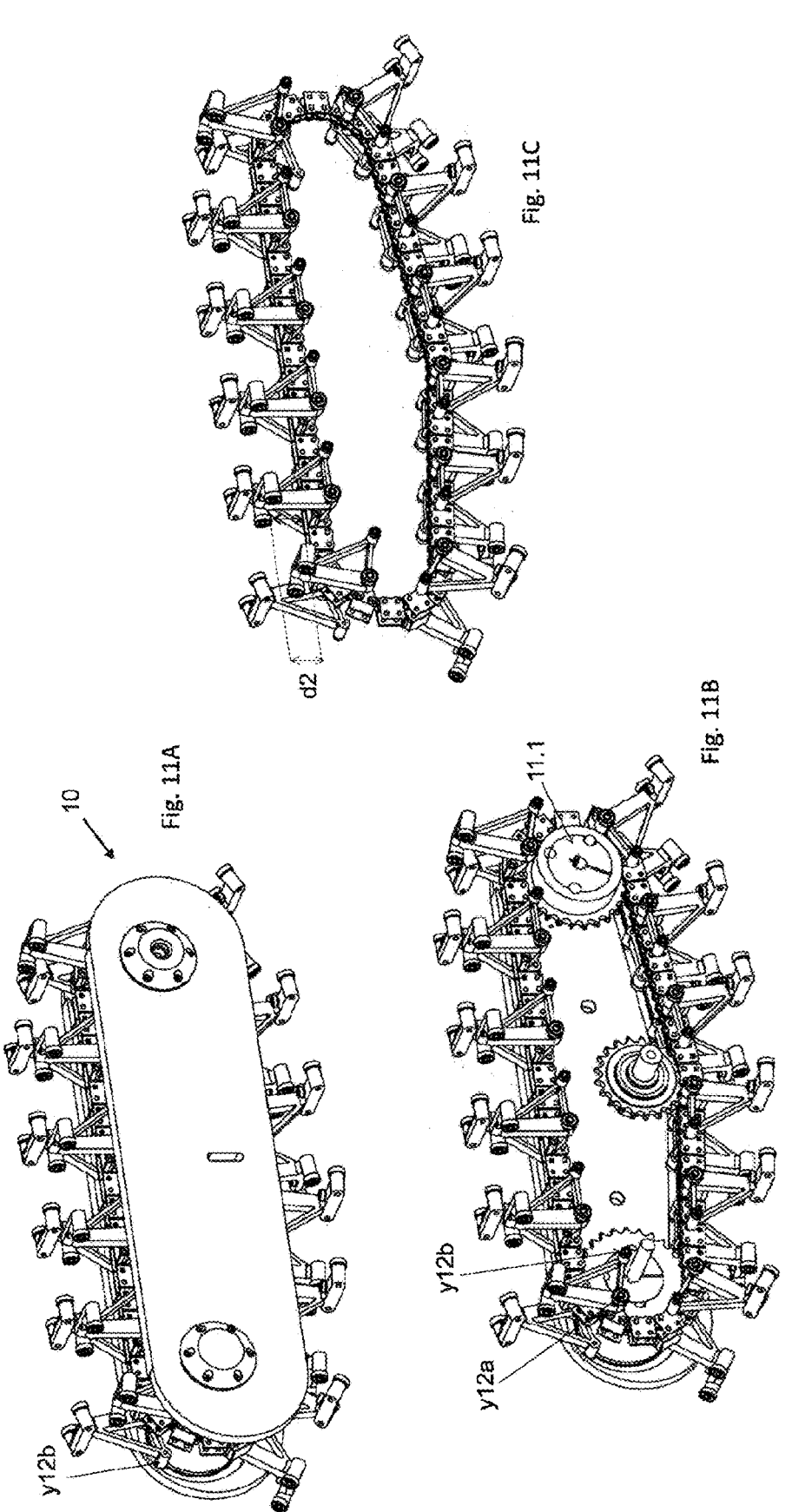
FIGS. 11A, 11B, 11C, 14A, 14B show in perspective views details of suspension elements (and their suspension) of a ceiling vehicle according to embodiments, especially according to the embodiment shown in FIG. 10.
Figure 12B:
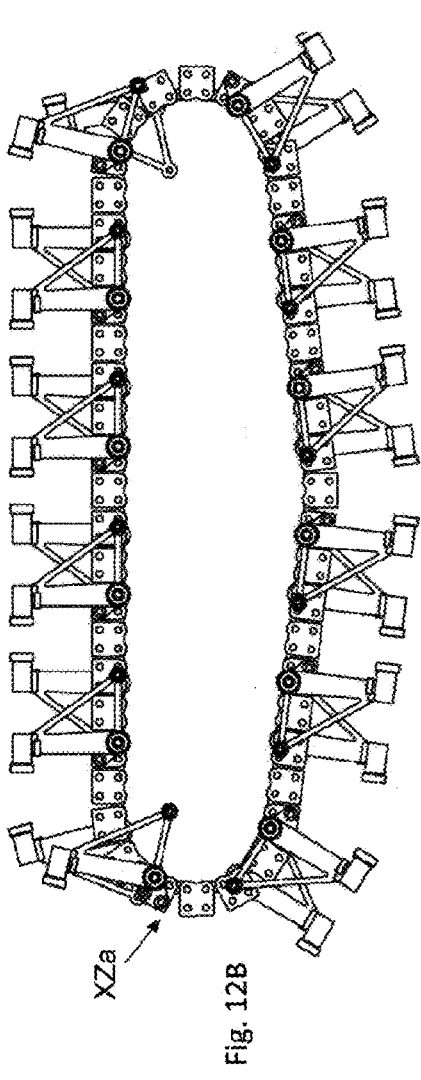
FIGS. 12A, 12B show in side views details of suspension elements of a ceiling vehicle according to embodiments, especially according to the embodiment shown in FIG. 10.
Figure 12A:
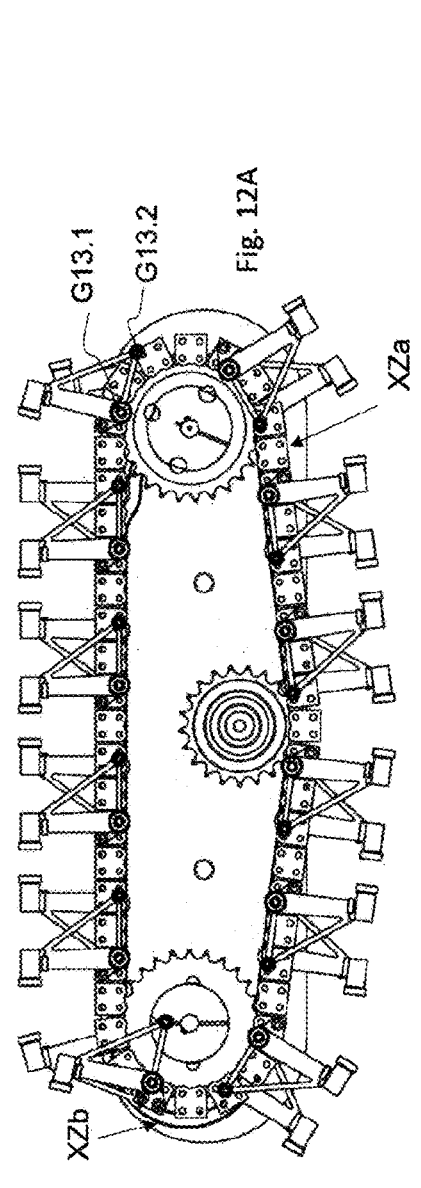

In FIG. 6A, 10A, 11C, a contact point distance Δd provided by different protruding distances d1, d2 of the suspension element's contactpoint P13 and of the counter bearing's contact point (free end, especially wheel/pulley) is illustrated by referring to the relative arrangement at the (ceiling) structure, respectively.

LIST OF REFERENCE SIGNS

1 structure, e.g. ceiling structure
1*a* raster defined by the structure
1.1 profile rail, especially T-profile resp. T-rail
1.2 wheel tread
1.3 power rail
10 vehicle, especially ceiling vehicle
11 drive unit (especially crawler track-like)
11.1 drive mechanism
11.2 lateral area resp. surface shell of the drive unit(s)
11*a* first drive unit, especially chain drive unit
11*b* further (second) drive unit

11*c* further (third) drive unit
12 circumferential track
12*a* first circumferential track, especially comprising a chain
12*b* second circumferential track
12*p* parallel section/linear section of the track
12*r* redirection section/curved section of the track
13 suspension element resp. chain element
13*b* further suspension element
13.1, 13.2 first pulley, second pulley
13.3 wheel
13.4 current collector resp. power-slider (conductive slider for energy transfer)
13.5 lever arm
13.6 protruding section/suspension arm
13.7 protruding axial section (guiding bolt or shaft)
14 guiding plank or rail
15 longitudinal connecting element, especially chain element
15*a* closed loop of interrelated suspension elements, especially chain
16 counter bearing
16.1 wheel, pulley
17 motor or actuator (optional), especially chain drive
18 gear unit
18*a* further gear unit
18*b* chain tensioning device
19 energy storage unit
20 de-/coupling kinematics
20*a* vertical motion kinematics
20*b* non-circular pivot motion kinematics
30 control unit
40 sensor arrangement
50 hoist unit
51 traction mechanism, especially rope winch
53 transmission means, especially rope
100 crawler type (ceiling) vehicle arrangement
Cr instantaneous centre of rotation
d1 protruding distance of the suspension element's contact point
d2 protruding distance of a/the counter bearing's contact point
Δd contact point distance
G13.1 first guiding point or axis (coupling the first track and the suspension element)
G13.2 second guiding point or axis (coupling the second track and the suspension element)
P13 contacting/bearing point/area of the suspension element with the ceiling structure
X13.1 first pulley axis
X13.2 second pulley axis
XZa shape/contour of the first circumferential track
XZb shape/contour of the second circumferential track
Y13.3 wheel axis
y12*a* predefined first longitudinal positions
y12*b* predefined second longitudinal positions
y13 longitudinal extension of lever arm
x first spatial direction, especially direction of longitudinal extension of T-profiles
y second spatial direction, especially longitudinal direction or driving direction
z third spatial direction, especially vertical direction

What is claimed is:

1. A crawler type vehicle configured for traveling in a suspended manner headlong at a structure, wherein the vehicle comprises:

a plurality of suspension elements configured for suspending the vehicle and configured for coupling the vehicle to the structure; and at least one drive unit configured for circumferential motion and accommodating a first circumferential track and a second circumferential track having a different circumferential shape than the first circumferential track, wherein the suspension elements are attached to the first circumferential track at predefined first longitudinal positions corresponding to a predefined raster, wherein the vehicle is configured for moving along the structure by decoupling a subset of the plurality of suspension elements from and coupling them into the structure when the suspension elements are guided along the two circumferential tracks by the circumferential motion.

2. The crawler type vehicle according to claim 1, wherein the at least one drive unit of the crawler type vehicle is configured for enabling a closed loop trajectory of the suspension elements.

3. The crawler type vehicle according to claim 1, wherein the first and second circumferential tracks are shaped in such a manner that the suspension elements are coupled to and decoupled from the structure only when passing a curved section of the tracks.

4. The crawler type vehicle according to claim 1, wherein the suspension elements are fixedly coupled by means of a first pulley to the first circumferential track, wherein the suspension elements are guided within the second circumferential track by means of a second pulley respectively, wherein the first and second pulley preferably are arranged at a lever arm of the respective suspension element, wherein the respective suspension element preferably has an L-shape;

wherein each suspension element exhibits a first pulley and a second pulley arranged in longitudinal distance with respect to the first pulley at a lever arm of the respective suspension element, wherein the suspension element is coupled to the first and second tracks via the first and second pulleys;

wherein each suspension element exhibits a lever arm supporting the pulley guided by the second track, wherein the pulley is arranged at a free end of the lever arm, and wherein in a linear section of the track, the lever arm is pointing in the driving direction, at least roughly;

wherein the suspension elements are connected to each other by means of longitudinal connecting elements, especially by longitudinal connecting elements being connected at the axis of the first pulley of the respective suspension element, thereby forming a closed loop of interrelated suspension elements distanced to each other in the predefined raster.

5. The crawler type vehicle according to claim 1, wherein the first circumferential track exhibits a chain or is defined by a chain forming a closed loop of interrelated chain elements;

wherein the first circumferential track is defined by a chain connecting the suspension elements;

wherein the vehicle exhibits a plurality of counter bearings, wherein the plurality of counter bearings are preferably coupled to the first circumferential track.

6. The crawler type vehicle according to claim 1, wherein the vehicle exhibits a further drive unit accommodating further circumferential tracks, wherein a plurality of further suspension elements are attached to the further circumferential tracks in predefined longitudinal positions corresponding to the predefined raster and are configured for suspending the vehicle and for coupling the vehicle to the structure;

wherein the vehicle also exhibits further suspension elements which are attached to further circumferential tracks, wherein the suspension elements and the further suspension elements momentarily engaging the structure are securing the vehicle at the structure with respect to the driving direction and opposite thereto;

wherein the vehicle exhibits a further drive unit which exhibits the same configuration as the first drive unit but with mirror-inverted arrangement of the further suspension elements and further circumferential tracks, wherein the further suspension elements are guided in a direction opposite to the guiding direction of the suspension elements of the first drive unit, wherein both the respective suspension elements and further suspension elements are simultaneously coupling to and decoupling from the structure.

7. The crawler type vehicle according to claim 6, wherein the at least one drive unit is configured for lifting the respective suspension element out of the structure in an unloaded state, especially such that the at least one crawler type drive unit provides for both coupling and decoupling kinematics for a subset of momentarily unloaded suspension elements and suspension of the vehicle by a subset of momentarily loaded suspension elements at the same time;

wherein the at least one drive unit has a substantially plane configuration;

wherein the vehicle exhibits at least two the drive units which arranged in parallel to each other;

wherein the circumferential tracks are respectively guided in a plane, extending in two-dimensional manner.

8. The crawler type vehicle according to claim 1, wherein the vehicle is configured for traveling in at least two spatial directions, namely a first spatial direction being predefined by the structure and a second spatial direction being defined by the guiding motion of the at least one drive unit, wherein the second spatial direction is orthogonal to the first spatial direction, preferably providing for at least two-dimensional locomotion capability of the vehicle;

wherein the respective suspension element exhibits at least one wheel which is arranged and configured for being guided along the structure;

wherein the at least one drive unit is coupled by means of at least three suspension elements; and wherein the respective suspension element has an L-shape which provides for two arms defining the relative arrangement of the wheel and first and second pulleys of the respective suspension element.

9. The crawler type vehicle according to claim 1, wherein the suspension elements are configured for being guided along the profiles in a spatial direction being defined by the structure, the vehicle's traveling motion having at least two degrees of freedom; and wherein the structure exhibits a plurality of profiles defining the raster of the structure, wherein the vehicle exhibits a plurality of further suspension elements suspending the vehicle together with the suspension elements, wherein the suspension elements and the further suspension elements secure the vehicle at the structure with respect to the driving/traveling direction.

10. The crawler type vehicle according to claim 9, wherein the profiles respectively exhibit at least one power rail, wherein the vehicle is configured for driving the at least one drive unit by means of energy supplied via the power rails, especially via current collectors provided within the suspension elements.

11. A method of hanging a crawler type vehicle from a structure for traveling in a suspended manner headlong the structure, wherein the vehicle is suspended by means of a plurality of suspension elements coupling the vehicle to the structure, wherein a circumferential guiding motion is defined by first and second circumferential tracks having a different circumferential shape, wherein the suspension elements are attached to the first circumferential track at predefined first longitudinal positions corresponding to a raster defined by the structure, wherein the vehicle is suspended such that it can move along the structure by decoupling a subset of the plurality of suspension elements from and coupling them into the structure when the suspension elements are guided along the circumferential tracks by the circumferential motion.

12. The method according to the claim 11, wherein the circumferential motion is transmitted by the suspension elements momentarily engaging the structure; and wherein the circumferential motion is provided by first and second drive units, wherein the first drive unit provides for a circumferential motion of a first subset of the suspension elements on a first closed loop trajectory and the second drive unit provides for a circumferential motion of a second subset of the suspension elements on a second closed loop trajectory.

13. The method according to claim 11, wherein the circumferential guiding motion is a passive guiding motion in reaction to external actuation on the vehicle.

14. The method according to claim 11, further comprising a computer and a computer program comprising instructions which, when executed by the computer, cause the computer to execute steps of the method in context with provision and control of the circumferential guiding motion by controlling the at least one drive unit.

* * * * *